(12) United States Patent
Shimotani et al.

(10) Patent No.: US 12,552,308 B2
(45) Date of Patent: Feb. 17, 2026

(54) DRIVE ASSIST APPARATUS AND DRIVE ASSIST METHOD

(71) Applicant: Mitsubishi Electric Corporation, Tokyo (JP)

(72) Inventors: Mitsuo Shimotani, Tokyo (JP); Tadashi Miyahara, Tokyo (JP); Yoshinori Ueno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 319 days.

(21) Appl. No.: 18/272,648

(22) PCT Filed: Apr. 13, 2021

(86) PCT No.: PCT/JP2021/015267
§ 371 (c)(1),
(2) Date: Jul. 17, 2023

(87) PCT Pub. No.: WO2022/219700
PCT Pub. Date: Oct. 20, 2022

(65) Prior Publication Data
US 2024/0075867 A1    Mar. 7, 2024

(51) Int. Cl.
*B60Q 1/08* (2006.01)
*B60K 35/233* (2024.01)
(Continued)

(52) U.S. Cl.
CPC ............ *B60Q 1/085* (2013.01); *B60K 35/233* (2024.01); *B60Q 1/10* (2013.01); *B60W 40/076* (2013.01);
(Continued)

(58) Field of Classification Search
CPC ...... B60Q 1/085; B60Q 1/10; B60Q 2300/20; B60Q 2300/324; B60Q 2400/50;
(Continued)

(56) References Cited

U.S. PATENT DOCUMENTS

2018/0148072 A1 * 5/2018 Kamiya ................. B60W 50/14
2018/0222492 A1   8/2018 Takii et al.

FOREIGN PATENT DOCUMENTS

JP    2017-191369 A    10/2017
JP    2019-12483 A     1/2019
(Continued)

OTHER PUBLICATIONS

International Search Report (PCT/ISA/210) issued in PCT/JP2021/015267, dated Jun. 29, 2021.
(Continued)

*Primary Examiner* — Yuen Wong
(74) *Attorney, Agent, or Firm* — BIRCH, STEWART, KOLASCH & BIRCH, LLP

(57) ABSTRACT

Provided is a drive assist apparatus visually notifying a driver of information regarding a gradient of a road. A drive assist apparatus includes processing circuitry. The processing circuitry is to acquire gradient information of a road in which gradient illusion is estimated to occur in a driver of a vehicle. The processing circuitry is to perform control on an irradiation apparatus provided to the vehicle so that the irradiation apparatus projects a gradient recognition pattern on a target object or on a projection surface provided in front of a driver seat of the vehicle to display the gradient recognition pattern in overlapped fashion with the target object. The target object is located in front of the vehicle and extends along the road. The gradient recognition pattern includes at least one graphic based on the gradient information of the road and disposed along the extension direction of the target object.

18 Claims, 22 Drawing Sheets

(51) Int. Cl.
*B60Q 1/10* (2006.01)
*B60W 40/076* (2012.01)
*B60K 35/21* (2024.01)

(52) U.S. Cl.
CPC ..... *B60K 35/211* (2024.01); *B60K 2360/1868* (2024.01); *B60Q 2300/20* (2013.01); *B60Q 2300/324* (2013.01); *B60Q 2400/50* (2013.01)

(58) Field of Classification Search
CPC ...... B60Q 1/50; B60K 35/233; B60K 35/211; B60K 2360/1868; B60K 2360/178; B60K 35/00; B60W 40/076
See application file for complete search history.

(56) References Cited

FOREIGN PATENT DOCUMENTS

JP         2019-211416 A      12/2019
WO    WO 2017/073636 A1      5/2017

OTHER PUBLICATIONS

Kitaoka, "Why Does Slope Illusion Occur? Where Can It Be Seen?", Vision, vol. 32, No. 2, 2020, pp. 45-46.
Tsuinashi et al., "The slope illusion: a review", Japanese Psychological Review, vol. 55, No. 3, 2012, pp. 400-409.
Japanese Office Action for Japanese Application No. 2023-514211, dated May 28, 2024, with an English translation.

* cited by examiner

DRIVE ASSIST APPARATUS AND DRIVE ASSIST METHOD

TECHNICAL FIELD

The present disclosure relates to a drive assist apparatus and a drive assist method.

BACKGROUND ART

Developed is a technique of projecting a character or a graphic around a vehicle in addition to illumination by a headlight of the vehicle. For example, Patent Document 1 discloses a vehicle illumination apparatus displaying advance notice information regarding an automatic travel control of a vehicle on a road surface in front of the vehicle or a window of the vehicle.

PRIOR ART DOCUMENTS

Patent Document(s)

Patent Document 1: International Publication No. 2017/073636

SUMMARY

Problem to be Solved by the Invention

A driver may have an illusion that a vehicle travels a road having a gradient different from an actual gradient depending on a travel environment. This phenomenon is called gradient illusion. An appropriate driving corresponding to a gradient of a road is required of a driver even when the gradient illusion easily occurs in the road.

In order to solve the problem described above, the present disclosure provides a drive assist apparatus visually notifying a driver of information regarding a gradient of a road.

Means to Solve the Problem

A drive assist apparatus according to the present disclosure includes processing circuitry. The processing circuitry is to acquire gradient information of a road in which gradient illusion is estimated to occur in a driver of a vehicle. The processing circuitry is to perform control on an irradiation apparatus provided to the vehicle so that the irradiation apparatus provided to the vehicle projects, by an illumination apparatus, a gradient recognition pattern on a target object. Alternatively, the processing circuitry is to perform control on the irradiation apparatus provided to the vehicle so that the irradiation apparatus provided to the vehicle projects the gradient recognition pattern on a projection surface provided in front of a driver seat of the vehicle to display the gradient recognition pattern in overlapped fashion with the target object. The target object is located in front of the vehicle and extends along the road. The gradient recognition pattern includes at least one graphic based on the gradient information of the road. The at least one graphic is disposed along an extension direction of the target object. The processing circuitry is to determine a method of the control on the irradiation apparatus based on a predetermined condition.

Effects of the Invention

According to the present disclosure, provided is a drive assist apparatus visually notifying a driver of information regarding a gradient of a road.

These and other objects, features, aspects and advantages of the present disclosure will become more apparent from the following detailed description and the accompanying drawings.

DESCRIPTION OF EMBODIMENT(S)

Embodiment 1

Figure 1:
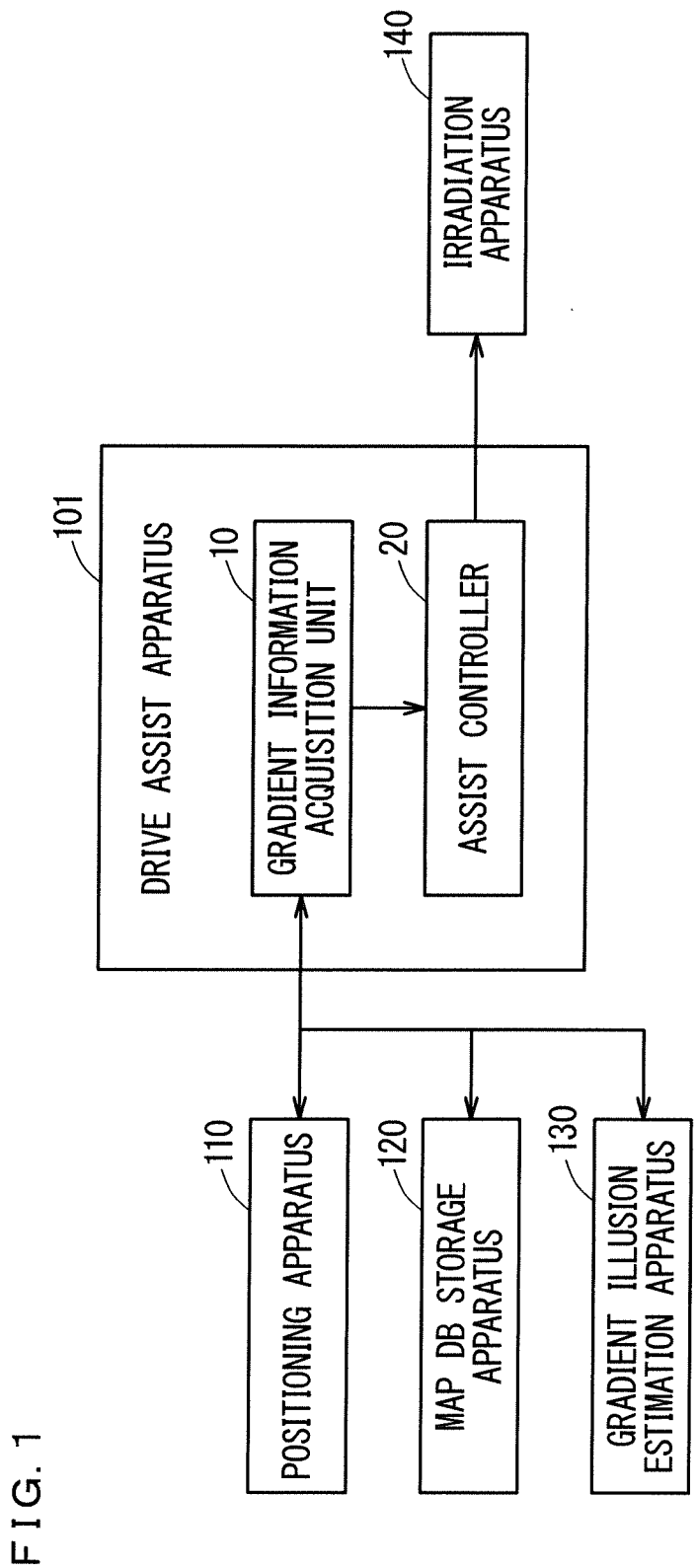
FIG. 1 A functional block diagram illustrating a configuration of a drive assist apparatus according to an embodiment 1.

FIG. 1 is a functional block diagram illustrating a configuration of a drive assist apparatus 101 according to an embodiment 1. FIG. 1 illustrates, as apparatuses to operate in relation to the drive assist apparatus 101, a positioning apparatus 110, a map database (map DB) storage apparatus 120, a gradient illusion estimation apparatus 130, and an irradiation apparatus 140.

The positioning apparatus 110 is mounted on a vehicle to detect a position of the vehicle. The positioning apparatus 110 includes a global navigation satellite system (GNSS) receiver and a vehicle sensor, for example. The positioning apparatus 110 receives positioning data via the GNSS receiver to detect the position of the vehicle. Furthermore, the positioning apparatus 110 may acquire map information from the map DB storage apparatus 120 to execute map matching. The positioning apparatus 110 may acquire sensor information acquired by various types of vehicle sensor to correct positional information of the vehicle.

The map DB storage apparatus 120 stores a high-accuracy map DB. The high-accuracy map DB includes gradient information for each point in a traffic lane of a road, for example. The gradient information is information of a longitudinal gradient. The high-accuracy map DB may include gradient illusion occurrence area information. The gradient illusion occurrence area information is information regarding an area where gradient illusion has occurred in a driver before.

The gradient illusion estimation apparatus 130 estimates occurrence of gradient illusion in a driver of the vehicle. The gradient illusion estimation apparatus 130 estimates occurrence of the gradient illusion based on the positional information of the vehicle and the gradient information of the road. Specifically, the gradient illusion estimation apparatus 130 estimates occurrence of the gradient illusion based on the gradient information in each point in a travel trajectory of the vehicle and the gradient information in each point in a travel direction of the vehicle, for example. The gradient illusion estimation apparatus 130 may estimate occurrence of the gradient illusion in the driver based on the positional information of the vehicle and the gradient illusion occurrence area information.

Figure 2:
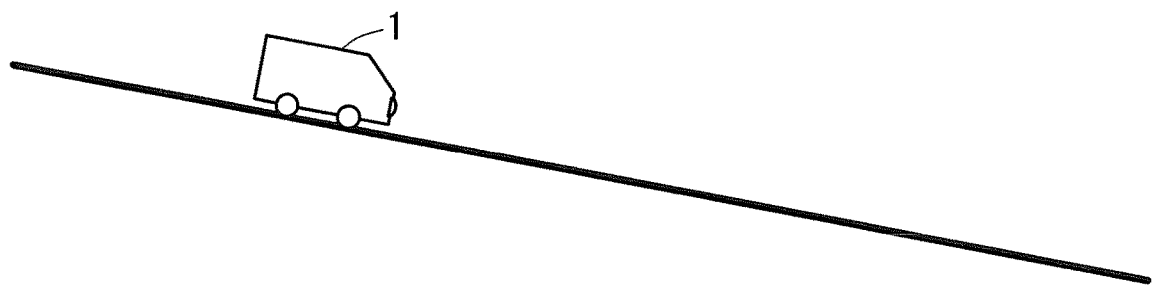
FIG. 2 A diagram illustrating a state where gradient illusion may occur.
Figure 3:
FIG. 3 A diagram illustrating a state where gradient illusion may occur.

The gradient illusion includes states described hereinafter. FIG. 2 and FIG. 3 are diagrams each illustrating a state where the gradient illusion may occur. FIG. 2 illustrates an actual state, and FIG. 3 illustrates a state of gradient illusion. When a vehicle 1 travels a long downslope, a driver has an illusion that the vehicle 1 travels a road with no gradient. Although not shown in the diagrams, the same applies to a case where the road is an upslope. When the vehicle 1 travels a long upslope, a driver may have an illusion that the vehicle 1 travels a road with no gradient in some cases.

Figure 4:
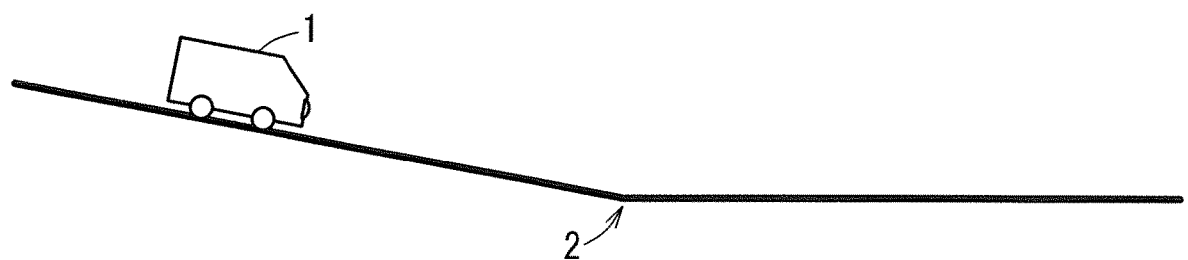
FIG. 4 A diagram illustrating another state where gradient illusion may occur.
Figure 5:
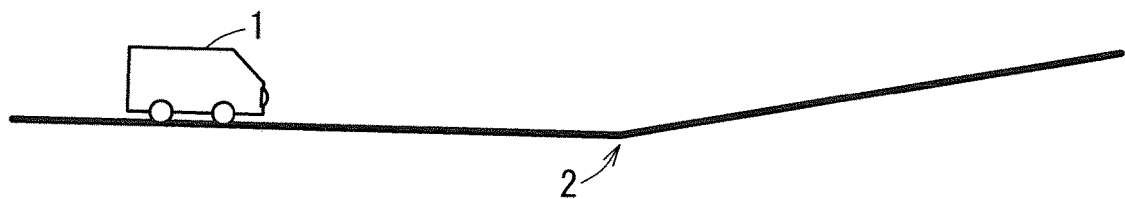
FIG. 5 A diagram illustrating another state where gradient illusion may occur.

FIG. 4 and FIG. 5 are diagrams each illustrating another state where the gradient illusion may occur. FIG. 4 illustrates an actual state, and FIG. 5 illustrates a state of gradient illusion. As illustrated in FIG. 4, a road having a lower gradient than a downslope is connected to the downslope. A point where the gradient changes (referred to as a gradient change point 2 hereinafter) is located in front of the vehicle 1. As illustrated in FIG. 5, the driver has an illusion that the driver currently travels a road with no gradient, and an upload is located in front of the vehicle 1. Although not shown in the diagrams, the same applies to a case where the road is an upslope. For example, when the vehicle 1 travels a gentle upslope and a steeper upslope continues in front of the vehicle 1, the driver may have an illusion that the driver travels a road with no gradient currently and an upslope is located in front of the vehicle 1. The gradient illusion illustrated in FIG. 2 to FIG. 5 is called longitudinal gradient illusion.

Figure 6:
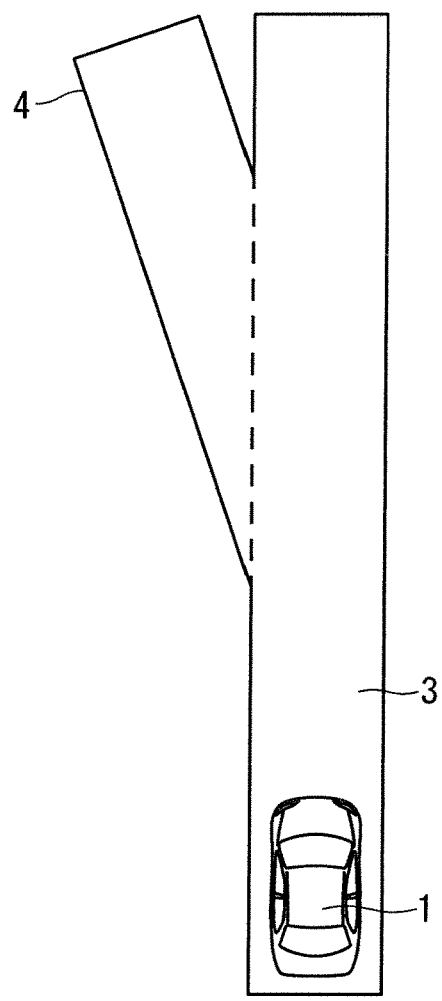
FIG. 6 A diagram illustrating another state where gradient illusion may occur.
Figure 7:
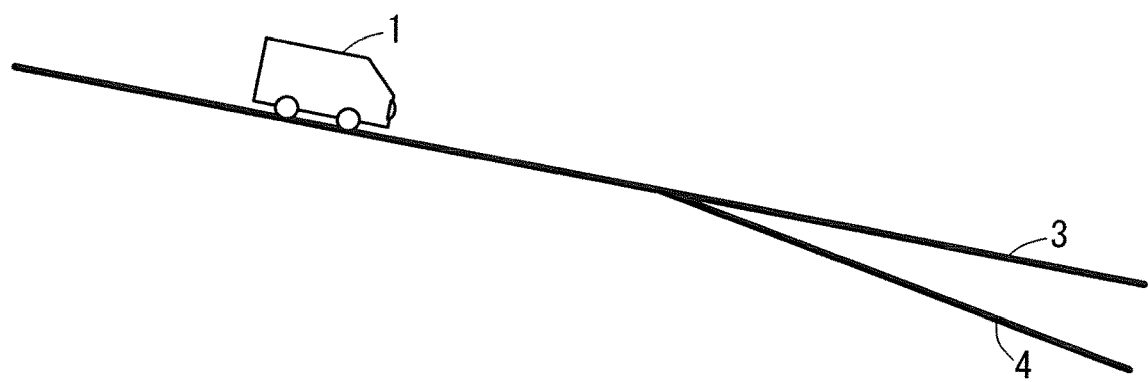
FIG. 7 A diagram illustrating another state where gradient illusion may occur.
Figure 8:
FIG. 8 A diagram illustrating another state where gradient illusion may occur.

FIG. 6 to FIG. 8 are diagrams each illustrating another state where the gradient illusion may occur. FIG. 6 illustrates a planar configuration of the road. FIGS. 7 and 8 illustrate a degree of the gradient of the road. With regard to the degree of the gradient, FIG. 7 illustrates an actual state, and FIG. 8 illustrates a state of gradient illusion. As illustrated in FIG. 6, the vehicle 1 travels a main lane 3, and a branch lane 4 is located in front of the vehicle 1. Both the main lane 3 and the branch lane 4 are downslopes, and a gradient of the branch lane 4 is steeper than that of the main lane 3. In this case, as illustrated in FIG. 8, the driver has an illusion that the gradient of the main lane 3 in which the vehicle 1 currently travels and the gradient of the branch lane 4 are the same as each other, and the gradient of the main lane 3 further extending from a branch point is gentle. In other words, the driver has an illusion that a downward gradient of the branch lane 4 is more gentle than an actual gradient thereof. Although not shown in the diagrams, the same applies to a case where the main lane 3 and the branch lane 4 are upslopes.

The irradiation apparatus 140 is provided to the vehicle 1. The irradiation apparatus 140 is an exterior illumination apparatus, for example. The exterior illumination apparatus is attached outside the vehicle 1. The exterior illumination apparatus may double as a headlight, or may be an illumination apparatus different from the headlight. The irradiation apparatus 140 may be a light source unit of a head-up display (HUD). The HUD is provided inside the vehicle 1.

The drive assist apparatus 101 includes a gradient information acquisition unit 10 and an assist controller 20.

The gradient information acquisition unit 10 acquires gradient information of a road in which gradient illusion is estimated to occur in the driver of the vehicle 1. For example, when the gradient illusion estimation apparatus 130 estimates occurrence of the gradient illusion, the gradient information acquisition unit 10 acquires the gradient information of a traffic lane in a travel direction of the vehicle 1 from the map DB storage apparatus 120.

The assist controller 20 performs control on the irradiation apparatus 140 so that the irradiation apparatus 140 projects a gradient recognition pattern on a target object. The target object is located in front of the vehicle 1 and extends along the road. The gradient recognition pattern includes at least one graphic based on the gradient information of the road. The at least one graphic is disposed along an extension direction of the target object. The target object is a road surface of the road, a boundary line of a traffic lane drawn on the road surface or a sidewall provided on a lateral side of the road.

The assist controller 20 may perform control on the irradiation apparatus 140 so that the irradiation apparatus 140 projects the gradient recognition pattern on a projection surface provided in front of a driver seat of the vehicle 1 to display the gradient recognition pattern in overlapped fashion with the target object. The projection surface may be a screen of an HUD or a front window of the vehicle 1.

The irradiation apparatus 140 projects the gradient recognition pattern on the target object in front of the vehicle 1, or projects the gradient recognition pattern on the projection surface in front of the vehicle 1, in accordance with control of the assist controller 20.

Figure 9:
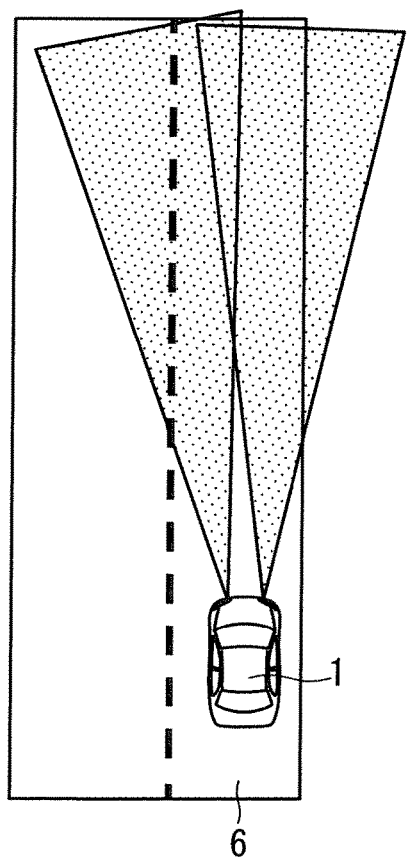
FIG. 9 A diagram illustrating a road surface where a gradient recognition pattern is not projected.

FIG. 9 is a diagram illustrating a road surface where the gradient recognition pattern is not projected. The vehicle 1 travels the traffic lane 6 on a right side of the road, and a road surface in front of the vehicle 1 is illuminated by a headlight.

Figure 10:
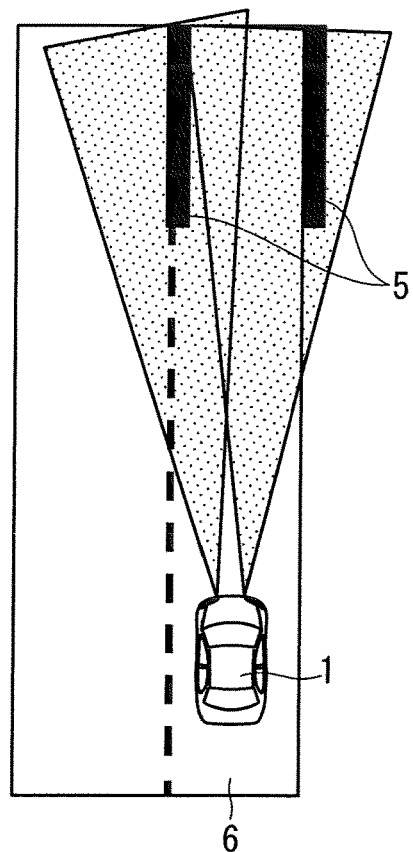
FIG. 10 A diagram illustrating a road surface where a gradient recognition pattern is projected.

FIG. 10 is a diagram illustrating a road surface where a gradient recognition pattern 5 is projected. In addition to the illumination by the headlight, the gradient recognition pattern 5 is projected on the road surface by the irradiation apparatus 140. Herein, the gradient recognition pattern 5 is a pair of linear patterns along both ends of the traffic lane 6 on the right side in which the vehicle 1 travels. Projection of the gradient recognition pattern 5 by the irradiation apparatus 140 is also referred to as an assist irradiation.

In this manner, the gradient recognition pattern 5 is projected on the road surface, thus the driver visually recognizes the gradient of the road. In other words, the gradient recognition pattern 5 is a pattern for making the driver recognize the gradient of the road. For example, the driver recognizes the gradient of the road by the gradient recognition pattern 5, thereby recognizes that the driver is in a state of gradient illusion or recognizes that the driver almost enters a state of gradient illusion in advance.

Figure 11:
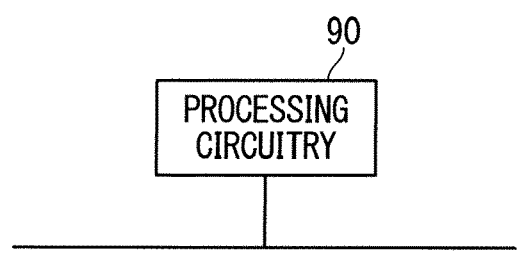
FIG. 11 A diagram illustrating an example of a configuration of processing circuitry included in a drive assist apparatus.

FIG. 11 is a diagram illustrating an example of a configuration of processing circuitry 90 included in the drive assist apparatus 101. Each function of the gradient information acquisition unit 10 and the assist controller 20 is achieved by the processing circuitry 90. In other words, the processing circuitry 90 includes the gradient information acquisition unit 10 and the assist controller 20.

When the processing circuitry 90 is dedicated hardware, a single circuit, a complex circuit, a programmed processor, a parallel-programmed processor, an application specific integrated circuit (ASIC), a field-programmable gate array (FPGA), or a combination of them, for example, falls under the processing circuitry 90. Each function of the gradient information acquisition unit 10 and the assist controller 20 may be individually achieved by a plurality of processing circuitry, or may also be collectively achieved by one processing circuitry.

Figure 12:
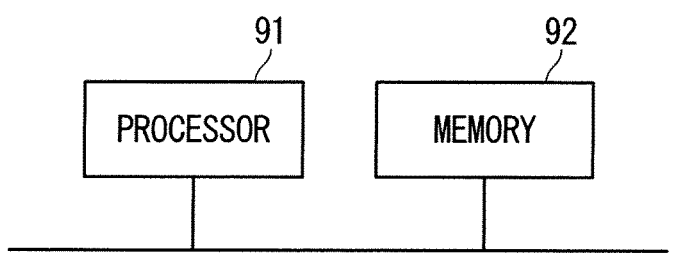
FIG. 12 A diagram illustrating another example of the configuration of the processing circuitry included in the drive assist apparatus.

FIG. 12 is a diagram illustrating another example of a configuration of processing circuitry included in the drive assist apparatus 101. The processing circuitry includes a processor 91 and a memory 92. The processor 91 executes a program stored in the memory 92, thereby achieving each function of the gradient information acquisition unit 10 and the assist controller 20. For example, the processor 91 executes software described as a program, thereby achieving each function. In this manner, the drive assist apparatus 101 includes the memory 92 storing a program and the processor 91 executing the program.

Described in the program is a function of the drive assist apparatus 101 to acquire gradient information of a road in which gradient illusion is estimated to occur in the driver of the vehicle 1. Further described in the program is a function of the drive assist apparatus 101 to perform control on the irradiation apparatus 140 provided to the vehicle 1 so that the irradiation apparatus 140 provided to the vehicle 1 projects the gradient recognition pattern 5 on the target object. Described in the program is a function of the drive assist apparatus 101 to perform control on the irradiation apparatus 140 so that the irradiation apparatus 140 projects the gradient recognition pattern 5 on the projection surface provided in front of the driver seat of the vehicle 1 to display the gradient recognition pattern 5 in overlapped fashion with the target object. The target object is located in front of the vehicle 1 and extends along the road. The gradient recognition pattern 5 includes at least one graphic based on the gradient information of the road. At least one graphic is disposed along the extension direction of the target object. The program makes a computer execute a procedure or a method of the gradient information acquisition unit 10 and the assist controller 20.

The processor 91 is a central processing unit (CPU), for example. The memory 92 may be a non-volatile or volatile semiconductor memory such as a random access memory (RAM), a read only memory (ROM), a flash memory, an erasable programmable read only memory (EPROM), or an electrically erasable programmable read only memory (EEPROM), for example. The memory 92 may be a storage medium such as a hard disk drive (HDD).

It is also applicable that a part of each function of the gradient information acquisition unit 10 and the assist controller 20 described above is achieved by dedicated hardware and the other part thereof is achieved by software. The processing circuitry achieves each function described above by a combination of hardware and software.

Figure 13:
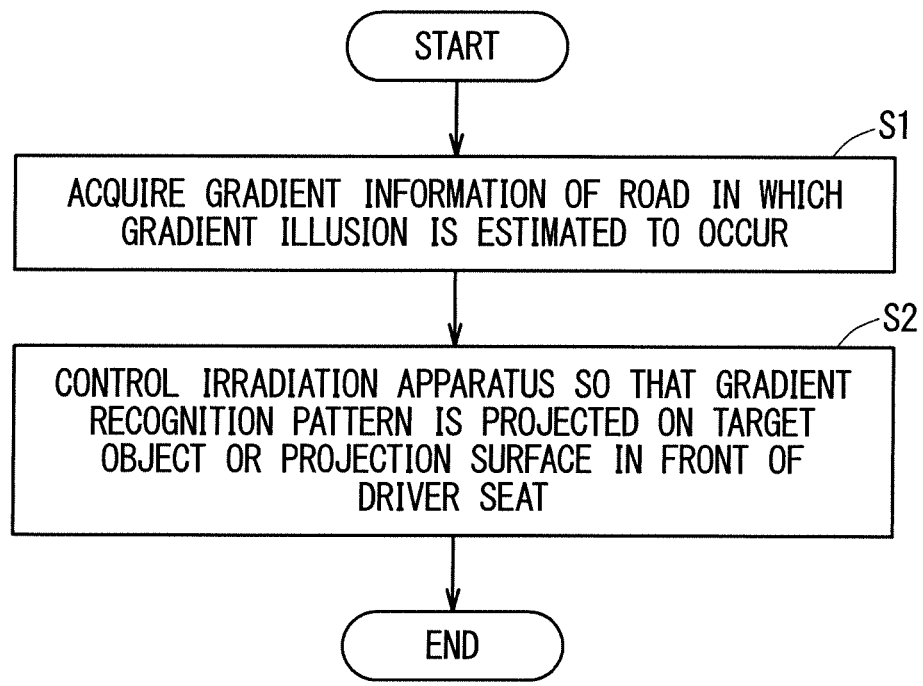
FIG. 13 A flow chart illustrating a drive assist method according to the embodiment 1.

FIG. 13 is a flow chart illustrating a drive assist method according to the embodiment 1.

In Step S1, the gradient information acquisition unit 10 acquires gradient information of a road in which gradient illusion is estimated to occur in the driver of the vehicle 1. For example, when the gradient illusion estimation apparatus 130 estimates occurrence of the gradient illusion, the gradient information acquisition unit 10 acquires the gradient information of the traffic lane 6 in the travel direction of the vehicle 1 from the map DB storage apparatus 120.

In Step S2, the assist controller 20 performs control on the irradiation apparatus 140 so that the irradiation apparatus 140 projects the gradient recognition pattern 5 on the target object. The assist controller 20 performs control on the irradiation apparatus 140 so that the irradiation apparatus 140 projects the gradient recognition pattern 5 on the projection surface provided in front of the driver seat to display the gradient recognition pattern 5 in overlapped fashion with the target object.

The irradiation apparatus 140 performs an assist irradiation in accordance with control of the assist controller 20. That is to say, the irradiation apparatus 140 projects the gradient recognition pattern 5 on the target object. Alternatively, the irradiation apparatus 140 projects the gradient recognition pattern 5 on the projection surface.

To summarize the above, the drive assist apparatus 101 according to the embodiment 1 includes the gradient information acquisition unit 10 and the assist controller 20. The gradient information acquisition unit 10 is to acquire the gradient information of the road in which gradient illusion is estimated to occur in the driver of the vehicle 1. The assist controller 20 is to perform control on the irradiation apparatus 140 provided to the vehicle 1 so that the irradiation apparatus 140 provided to the vehicle 1 projects the gradient recognition pattern 5 on the target object. Alternatively, the assist controller 20 is to perform control on the irradiation apparatus 140 so that the irradiation apparatus 140 projects the gradient recognition pattern 5 on the projection surface provided in front of the driver seat of the vehicle 1 to display the gradient recognition pattern 5 in overlapped fashion with the target object. The target object is located in front of the vehicle 1 and extends along the road. The gradient recognition pattern 5 includes at least one graphic based on the gradient information of the road. The at least one graphic is disposed along the extension direction of the target object.

Such a drive assist apparatus 101 visually notifies the driver of the information regarding the gradient of the road. The driver recognizes the gradient of the road through a sense of sight by the drive assist apparatus 101.

For example, the driver has an illusion that the vehicle travels along the road having the gradient different from the actual gradient depending on the travel environment of the vehicle as described above. In such a case, the driver may not perform an appropriate accelerator operation or brake operation. However, according to the drive assist apparatus 101, the driver recognizes the actual gradient by the gradient recognition pattern 5, thereby appropriately operating the accelerator and the brake.

Embodiment 2

Described are a drive assist apparatus, a drive assist system, and a drive assist method according to an embodiment 2. The embodiment 2 is a subordinate concept of the embodiment 1. In the embodiment 2, the same reference sign is assigned to a constituent element similar to that in the embodiment 1, and a detailed description thereof is omitted.

Figure 14:
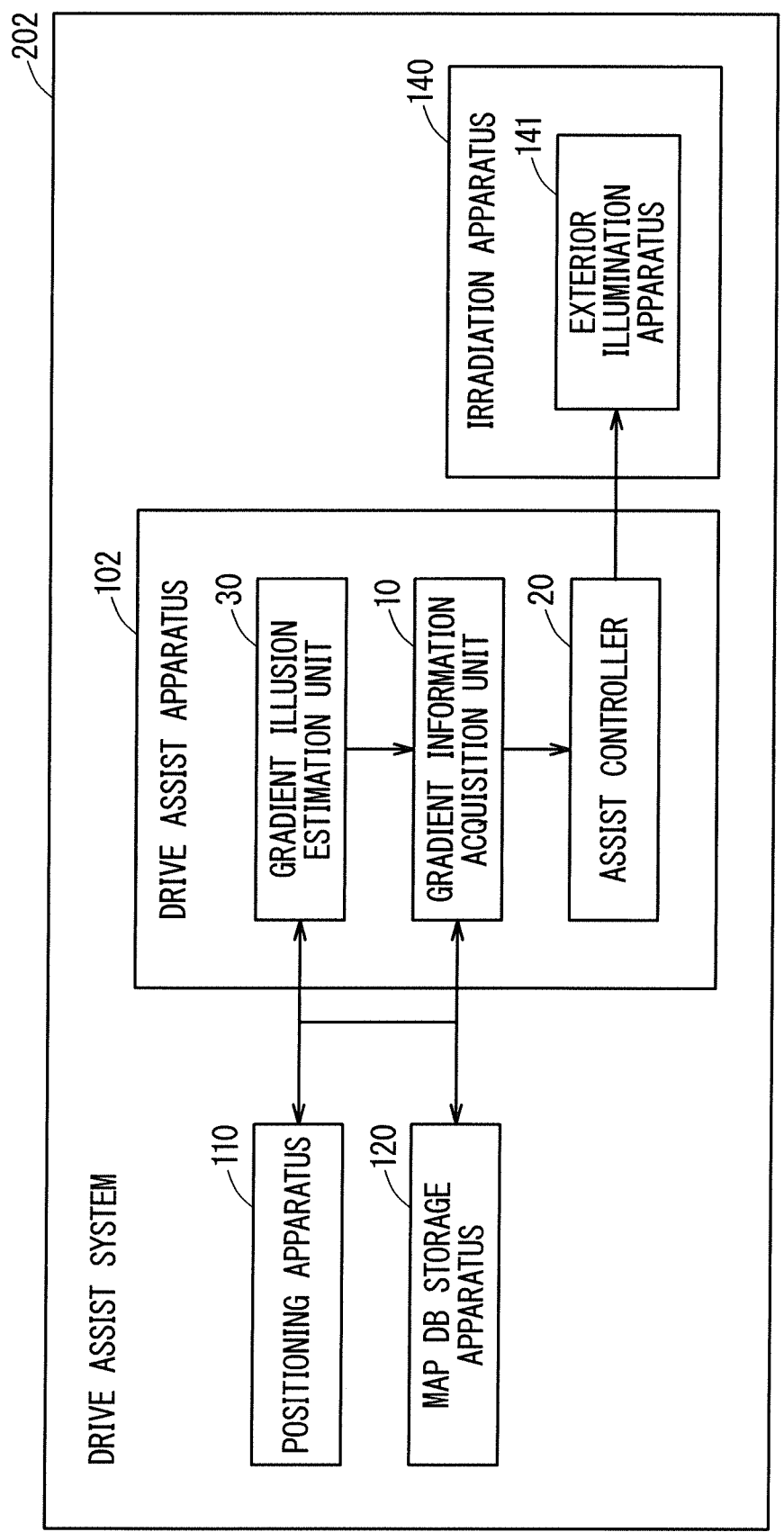
FIG. 14 A block diagram illustrating a configuration of a drive assist apparatus and a drive assist system according to an embodiment 2.

FIG. 14 is a block diagram illustrating a configuration of a drive assist apparatus 102 and a drive assist system 202 according to the embodiment 2. The drive assist system 202 includes the drive assist apparatus 102, the positioning apparatus 110, the map DB storage apparatus 120, and the irradiation apparatus 140. The irradiation apparatus 140 includes an exterior illumination apparatus 141.

The drive assist apparatus 102 includes a gradient illusion estimation unit 30, the gradient information acquisition unit 10, and the assist controller 20. The gradient illusion estimation unit 30 corresponds to the gradient illusion estimation apparatus 130 according to the embodiment 1.

The gradient illusion estimation unit 30 estimates occurrence of the gradient illusion in the driver based on the positional information of the vehicle 1 and the gradient information of the traffic lane 6 of the road. The gradient illusion estimation unit 30 may estimate that the gradient illusion has already occurred in the driver, or may also estimate a possibility of occurrence of the gradient illusion in the driver. The gradient illusion estimation unit 30 estimates occurrence of the gradient illusion based on the gradient information in each point in a travel trajectory of the vehicle 1 and the gradient information in each point in a travel direction of the vehicle 1, for example. Gradient illusion estimation methods (a) to (e) are exemplified hereinafter.

(a) When the vehicle 1 travels more than a predetermined distance on the traffic lane 6 having a gradient steeper than a predetermined gradient and the traffic lane 6 having the gradient steeper than the predetermined gradient continues in a travel direction of the vehicle 1, the gradient illusion estimation unit 30 estimates that there is a high possibility of occurrence of the gradient illusion in the driver. When an inclination of a downslope is expressed by a minus value (for example, a minus angle) and an inclination of an upslope is expressed by a plus value (for example, a plus angle), the gradient is an absolute value thereof. The predetermined distance is 100 m, for example. The distance is set to have a smaller value as a speed of the vehicle 1 is lower. The predetermined gradient is 5% in both the downslope and the upslope, for example. The gradient set in the upslope and the gradient set in the downslope may not be the same as each other. The speed of the vehicle 1 increases more easily on the downslope than on the upslope, thus the predetermined gradient in the downslope may be 4%. The predetermined gradient may be a statistically-calculated value such as an average value, a central value, a moving average value of a gradient in a predetermined distance, for example. These predetermined gradient and distance may be different in accordance with a probability of occurrence of the gradient illusion, that is to say, for each road.

(b) When the vehicle 1 travels the traffic lane 6 having a gradient steeper than a predetermined gradient for more than a predetermined period of time and the traffic lane 6 having the gradient steeper than the predetermined gradient continues in a travel direction of the vehicle 1, the gradient illusion estimation unit 30 may estimate that there is a high possibility of occurrence of the gradient illusion in the driver. The predetermined period of time is ten seconds, for example.

(c) When the vehicle 1 travels more than a predetermined distance on the traffic lane 6 having a gradient steeper than a predetermined gradient and there is a predetermined gradient difference between a gradient of the branch lane 4 branched from the main lane 3 and the main lane 3 in a travel direction of the vehicle 1, the gradient illusion estimation unit 30 may estimate that there is a high possibility of occurrence of the gradient illusion in the driver. The predetermined gradient difference is 4%, for example.

(d) When the vehicle 1 travels more than a predetermined distance on the traffic lane 6 having a gradient steeper than a predetermined gradient and the gradient change point 2 is located in a predetermined range in front of the vehicle 1, the gradient illusion estimation unit 30 may estimate that there is a high possibility of occurrence of the gradient illusion in the driver. The predetermined range is equal to or larger than 50 m and equal to or smaller than 100 m, for example.

(e) The gradient illusion estimation unit 30 may estimate occurrence of the gradient illusion by a method described in a published material. The published material is "The slope illusion: a review" by Seiichi TSUI-NASHI and Akiyoshi KITAOKA, Japanese Psychological Review, 2012, Vol. 55, NO. 3, p. 400-409 and "WHY DOES SLOPE ILLUSION OCCUR? WHERE CAN IT BE SEEN?" by Akiyoshi KITAOKA, VISION, 2020, Vol. 32, No. 2, p. 45-46, for example.

When the gradient illusion estimation unit 30 estimates that the gradient illusion has already occurred in the driver or there is a high possibility of occurrence of the gradient illusion in the driver from this time, the gradient information acquisition unit 10 acquires the gradient information of the traffic lane 6 in the travel direction of the vehicle 1 from the map DB storage apparatus 120.

The assist controller 20 performs control on the exterior illumination apparatus 141 so that the exterior illumination apparatus 141 projects the gradient recognition pattern 5 on the target object. The target object in the embodiment 2 is a road surface or a boundary line (white line, for example) of the traffic lane 6 drawn on a road surface. The gradient recognition pattern 5 includes a graphic based on the gradient information of the road, and the graphic is disposed along an extension direction of the target object. The assist controller 20 may locate a graphic of the gradient recognition pattern 5 in an extension direction of the road based on road shape data included in the high-accuracy map DB, for example. The road shape data is a road link or traffic lane link, for example.

The gradient recognition pattern 5 includes a graphic corresponding to a size and direction of the gradient of the traffic lane 6, that is to say, a graphic corresponding to an angle of the gradient. FIG. 15 to FIG. 19 are diagrams each illustrating an example of the gradient recognition pattern 5. FIG. 15 to FIG. 19 illustrate the gradient recognition pattern 5 in a case where the traffic lane 6 is a downslope. However, illustration of the traffic lane 6 is omitted in FIG. 15 to FIG. 19.

Figure 15:
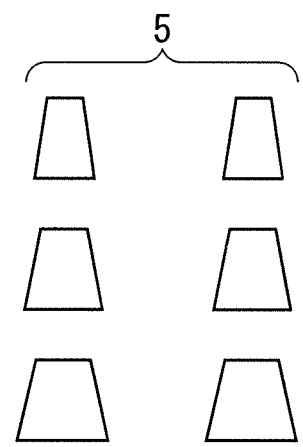
FIG. 15 A diagram illustrating an example of a gradient recognition pattern.

The gradient recognition pattern 5 illustrated in FIG. 15 includes a plurality of polygonal shapes projected along each of both ends of the traffic lane 6. In other words, the plurality of polygonal shapes are disposed along both ends of the traffic lane 6. A length of a region where the plurality of polygonal shapes are disposed is 20 m, for example. Each polygonal shape includes a first side located close to the vehicle 1 and a second side located far away from the vehicle 1. Herein, the traffic lane 6 is the downslope, thus each polygonal shape is a trapezoidal shape having first side longer than the second side. A difference in length between the first side and the second side may correspond to a magnitude of the gradient. Although illustration is omitted, when the gradient of the traffic lane 6 is horizontal, the assist controller 20 adopts a rectangular shape having the first side and the second side, whose lengths are the same as each other, as the gradient recognition pattern 5. When the traffic lane 6 is the upslope, the assist controller 20 adopts a trapezoidal shape having first side shorter than the second side as the gradient recognition pattern 5. When the traffic lane 6 is the downslope, the polygonal shape may be projected to be smaller with increasing distance from the vehicle 1, and when the traffic lane 6 is the upslope, the polygonal shape may be projected to be larger with increasing distance from the vehicle 1.

Figure 16:
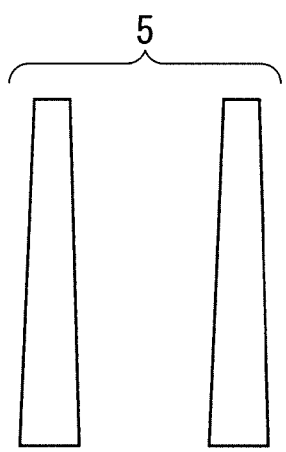
FIG. 16 A diagram illustrating an example of a gradient recognition pattern.

The gradient recognition pattern 5 illustrated in FIG. 16 is a pair of elongated trapezoidal shapes projected along both ends of the traffic lane 6.

Figure 17:
FIG. 17 A diagram illustrating an example of a gradient recognition pattern.

The gradient recognition pattern 5 illustrated in FIG. 17 has a form that a shadow corresponding to the gradient of the traffic lane 6 is added to the elongated trapezoidal shape illustrated in FIG. 16.

Figure 18:
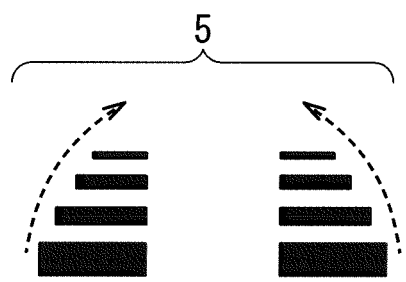
FIG. 18 A diagram illustrating an example of a gradient recognition pattern.

The gradient recognition pattern 5 illustrated in FIG. 18 includes a plurality of horizontal lines projected along each of both ends of the traffic lane 6. Herein, the traffic lane 6 is the downslope, thus a first horizontal line close to the vehicle 1 is longer than a second horizontal line far away from the vehicle 1 in the plurality of horizontal lines. The first horizontal line is thicker than the second horizontal line. It is preferable that an end portion located on an inner side of the traffic lane 6 in end portions of each horizontal line is aligned in the extension direction of the traffic lane 6. The end portion located on an outer side of the traffic lane 6 is disposed to be curved toward the inner side of the traffic lane 6 with increasing distance from the vehicle 1 as shown by a dotted arrow in FIG. 18. Although illustration is omitted, when the gradient of the traffic lane 6 is horizontal, a length and thickness of the first horizontal line are the same as those of the second horizontal line, respectively. When the traffic lane 6 is the upslope, the first horizontal line is shorter and thinner than the second horizontal line.

Figure 19:
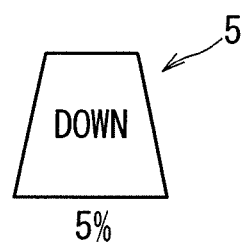
FIG. 19 A diagram illustrating an example of a gradient recognition pattern.

The gradient recognition pattern 5 illustrated in FIG. 19 includes a character pattern based on the gradient information in addition to the graphic. Herein, the character pattern includes a character indicating a magnitude "5%" and a direction "DOWN" of the gradient.

FIG. 20 to FIG. 23 are diagrams each illustrating another example of the gradient recognition pattern 5. FIG. 20 to FIG. 23 illustrate the gradient recognition pattern 5 in a case where the gradient change point 2 is located in front of the vehicle 1. The gradient recognition pattern 5 projected on a first point on a near side of the gradient change point 2 is different from the gradient recognition pattern 5 projected on a second point on a far side of the gradient change point 2. Illustration of the traffic lane 6 is omitted in FIG. 20 to FIG. 23.

Figure 20:
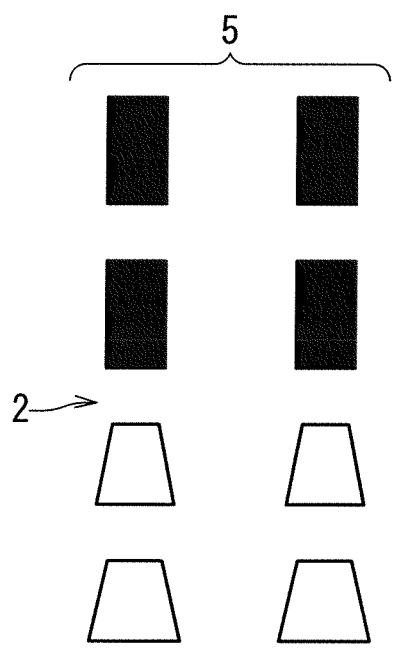
FIG. 20 A diagram illustrating another example of a gradient recognition pattern.

The gradient recognition pattern 5 illustrated in FIG. 20 includes a plurality of polygonal shapes in the manner similar to FIG. 15. In FIG. 20, the gradient of the traffic lane 6 is changed from downward to horizontal at the gradient change point 2. A trapezoidal shape is projected in the first point on the near side of the gradient change point 2. A length of a first side of the trapezoidal shape is longer than that of a second side. A rectangular shape is projected in the second point on the far side of the gradient change point 2. The assist controller 20 controls the exterior illumination apparatus 141 so that the gradient change point 2 of the actual traffic lane 6 and a change point in the projection form of the gradient recognition pattern 5 coincide with each other. The assist controller 20 may control the exterior illumination apparatus 141 so that a color of the trapezoidal shape in the first point and a color of the rectangular shape in the second point are different from each other. Although illustration is omitted, the direction and magnitude of the gradient of the traffic lane 6 are expressed by the length of the first side and the length of the second side of the polygonal shape when the first point is a downslope and the second point is a down slope having steeper gradient or when the first point is a downslope and the second point is an upslope.

Figure 21:
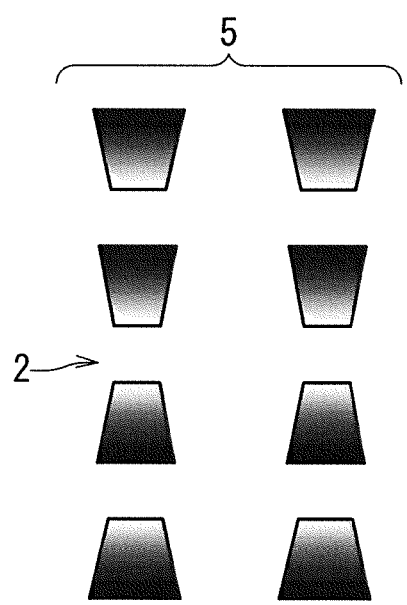
FIG. 21 A diagram illustrating another example of a gradient recognition pattern.

The gradient recognition pattern 5 illustrated in FIG. 21 includes a trapezoidal shape expressing the downslope in the first point and a trapezoidal shape expressing the upslope in the second point. Each trapezoidal shape is displayed in a color or pattern corresponding to the gradient of the traffic lane 6. The gradient recognition pattern 5 in FIG. 20 expresses the magnitude and direction of the gradient by shading and a direction of change of a gradation.

Figure 22:
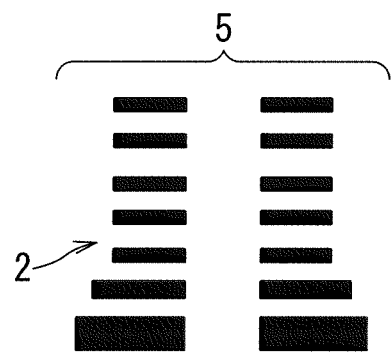
FIG. 22 A diagram illustrating another example of a gradient recognition pattern.

The gradient recognition pattern 5 illustrated in FIG. 22 includes a plurality of horizontal lines in the manner similar to FIG. 18. A region in the near side of the gradient change point 2, that is to say, a region including the first point is referred to as a first region, and a region in the far side of the gradient change point 2, that is to say, a region including the second point is referred to as a second region. In FIG. 22, the gradient of the traffic lane 6 is changed from downward to horizontal at the gradient change point 2. Lengths of the plurality of horizontal lines projected in the first region decrease with increasing distance from the vehicle 1. Lengths of the plurality of horizontal lines projected in the second region are constant.

Figure 23:
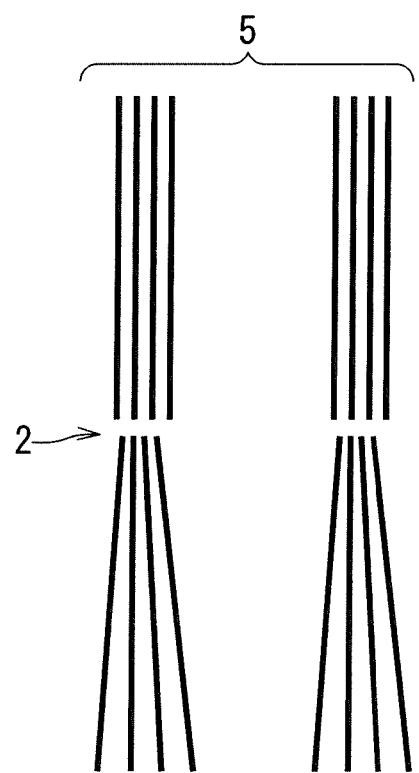
FIG. 23 A diagram illustrating another example of a gradient recognition pattern.

The gradient recognition pattern 5 illustrated in FIG. 23 includes a plurality of line segments extending along each of both ends of the traffic lane 6. In FIG. 23, the gradient of the traffic lane 6 is changed from downward to horizontal at the gradient change point 2. Intervals between the plurality of line segments projected in the first region decrease with increasing distance from the vehicle 1. The plurality of ling segments projected in the second region are parallel to each other. Although illustration is omitted, when the traffic lane 6 is the upslope, the intervals between the plurality of line segments increase with increasing distance from the vehicle 1.

The assist controller 20 according to the embodiment 2 controls the exterior illumination apparatus 141 so that the gradient recognition pattern 5 projected in a region other than a predetermined avoidance range in the traffic lane 6.

The avoidance range is a region on an inner side of both ends of the traffic lane 6, that is to say, a center part of the traffic lane 6. The assist controller 20 determines a projection position of each graphic so that the graphic of the gradient recognition pattern 5 is projected along a boundary line (white line, for example) of both ends of the traffic lane 6 based on an assumption that the vehicle 1 travels a center of the traffic lane 6, for example. In this case, as illustrated in FIG. 10, the gradient recognition pattern 5 is not projected in the center part of the traffic lane 6. The assist controller 20 may detect a position of the vehicle 1 in a lateral direction in the traffic lane 6 based on the road shape data included in the high-accuracy map DB and high-accuracy GNSS information to determine a position where the gradient recognition pattern 5 is projected. For example, the assist controller 20 may recognize the position of the boundary line on the road where the gradient recognition pattern 5 is projected based on the road shape data and the GNSS information.

The avoidance range may be a region within a predetermined avoidance distance from a front end of the vehicle 1. The avoidance distance is 50 m, for example. In this case, as illustrated in FIG. 10, the gradient recognition pattern 5 is not projected in a region close to the front end of the vehicle 1. As a result, the driver can easily recognize a front side of the vehicle 1.

Each of FIG. 15 to FIG. 19 illustrates the gradient recognition pattern 5 projected on the road surface of the linear traffic lane 6. Even when the traffic lane 6 is curved, the assist controller 20 controls the exterior illumination apparatus 141 so that the gradient recognition pattern 5 is projected along the curve of the traffic lane 6.

The gradient recognition pattern 5 is not limited to the graphic projected along both ends of the traffic lane 6. The gradient recognition pattern 5 may be one graphic projected in the center part of the traffic lane 6. The gradient recognition pattern 5 may be projected on one end in both ends of the traffic lane 6. The gradient recognition pattern 5 is not limited to a pattern made up of a plurality of graphics disposed in a row or in two rows, but may be a pattern made up of a plurality of graphics disposed in three or more rows. The graphic constituting the gradient recognition pattern 5 is not limited to the polygonal shape, but may be a circular shape. Various shapes can be applied to the graphic of the gradient recognition pattern 5. The assist controller 20 preferably adopt the gradient recognition pattern 5 which can be visually recognized by the driver easily in accordance with the travel environment of the vehicle 1, for example.

Each function of the gradient illusion estimation unit 30, the gradient information acquisition unit 10, and the assist controller 20 described above is achieved by the processing circuitry illustrated in FIG. 11 or FIG. 12.

Figure 24:
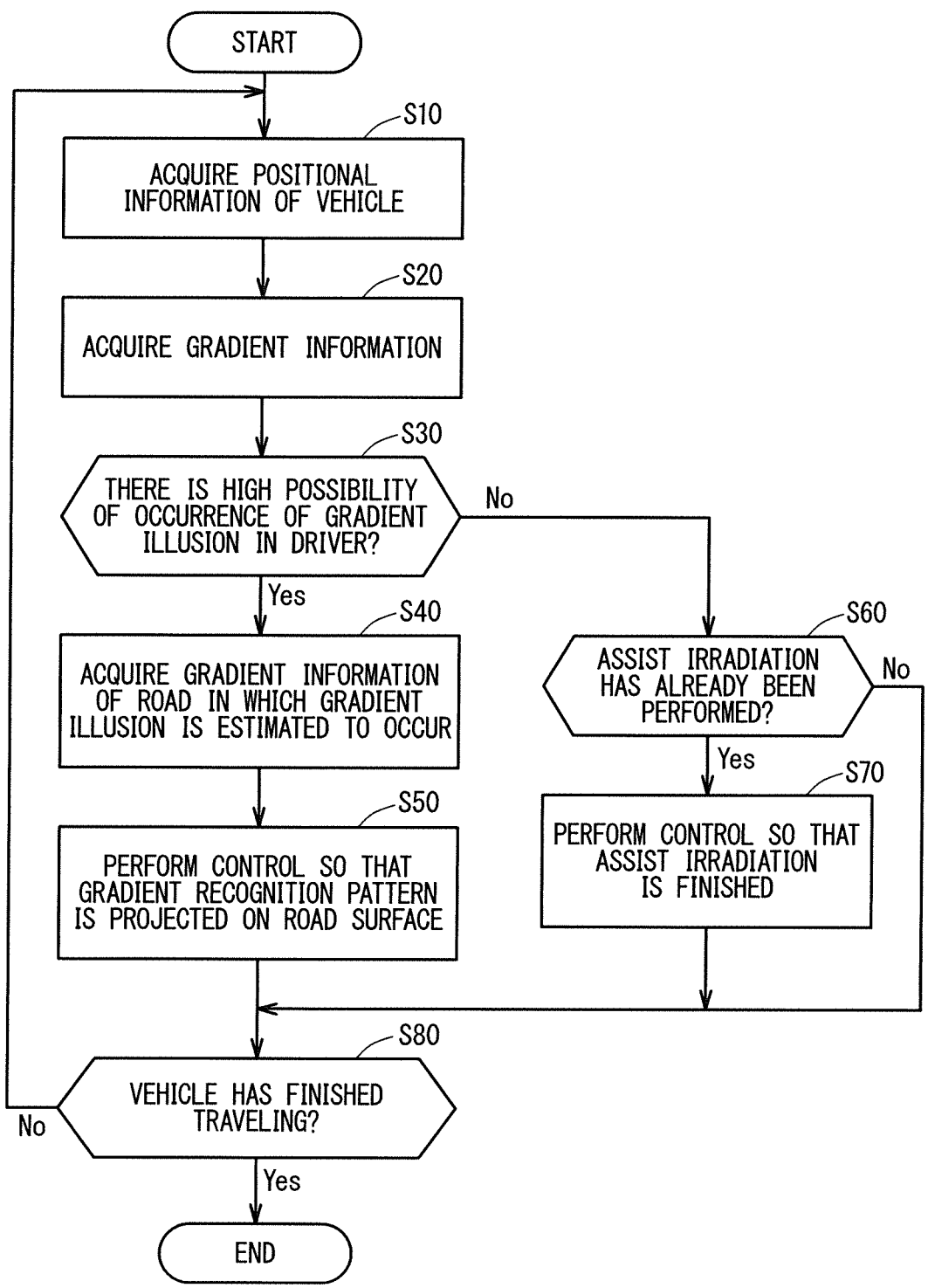
FIG. 24 A flow chart illustrating a drive assist method according to the embodiment 2.

FIG. 24 is a flow chart illustrating a drive assist method according to the embodiment 2.

In Step S10, the gradient illusion estimation unit 30 acquires the positional information of the vehicle 1 detected by the positioning apparatus 110.

In Step S20, the gradient illusion estimation unit 30 acquires the gradient information from the map DB storage apparatus 120 based on the positional information of the vehicle 1.

In Step S30, the gradient illusion estimation unit 30 estimates whether or not there is a high possibility of occurrence of the gradient illusion in the driver. When it is estimated that there is a high possibility of occurrence of the gradient illusion, Step S40 is executed. When it is estimated that there is not a high possibility of occurrence of the gradient illusion, Step S60 is executed.

In Step S40, the gradient information acquisition unit 10 acquires the gradient information of the road in which the gradient illusion is estimated to occur in the driver. The gradient information acquisition unit 10 acquires the gradient information of the traffic lane 6 in the travel direction of the vehicle 1 from the map DB storage apparatus 120 or the gradient illusion estimation unit 30.

In Step S50, the assist controller 20 performs control on the exterior illumination apparatus 141 so that the exterior illumination apparatus 141 projects the gradient recognition pattern 5 on the road surface. At this time, the assist controller 20 determines the gradient recognition pattern 5 and the position and range where the gradient recognition pattern 5 is projected. For example, the assist controller 20 selects one of the gradient recognition patterns 5 illustrated in FIG. 15 to FIG. 19, and determines the projection position thereof on the boundary line (white line, for example) on both ends of the traffic lane 6. The exterior illumination apparatus 141 performs an assist irradiation in accordance with control of the assist controller 20. That is to say, the exterior illumination apparatus 141 projects the gradient recognition pattern 5 on the boundary line of the traffic lane 6.

In Step S60, the assist controller 20 determines whether or not the exterior illumination apparatus 141, that is to say, the irradiation apparatus 140 has already performed the assist irradiation. When the irradiation apparatus 140 has already performed the assist irradiation, Step S70 is executed. When the irradiation apparatus 140 has not performed the assist irradiation, Step S80 is executed.

In Step S70, the assist controller 20 controls the irradiation apparatus 140 so that the irradiation apparatus 140 finishes the assist irradiation, that is to say, finishes projection of the gradient recognition pattern 5.

In Step S80, the assist controller 20 determines whether or not the vehicle 1 has finished traveling. If the vehicle 1 has not finished traveling, Step S10 is executed again. If the vehicle 1 has finished traveling, the drive assist method is finished.

Modification Example 1 of Embodiment 2

The high-accuracy map DB stored in the map DB storage apparatus 120 includes the gradient illusion occurrence area information indicating that the gradient illusion has occurred in the drivers of a plurality of vehicles before. The drivers of the plurality of vehicles may or may not include the driver of the vehicle 1 projecting the gradient recognition pattern 5. In other words, the gradient illusion occurrence area information is information indicating that the gradient illusion has occurred in an unspecified driver before. The gradient illusion occurrence area information is appropriately updated in accordance with occurrence of gradient illusion in an unspecified driver. The map DB storage apparatus 120 may be provided to the server or the vehicle 1. The gradient illusion occurrence area information includes information of the section of the road where the gradient illusion easily occurs, for example. The high-accuracy map UB stores the gradient illusion occurrence area information in road link data, for example. The gradient illusion occurrence area information may include data of a probability of gradient illusion occurrence.

The gradient illusion estimation unit 30 estimates occurrence of the gradient illusion in the driver based on the positional information of the vehicle 1 and the gradient illusion occurrence area information. When the probability of gradient illusion occurrence is equal to or larger than a predetermined value, the gradient illusion estimation unit 30 estimates that a probability of occurrence of the gradient illusion in the driver is high, for example.

The gradient illusion estimation unit 30 may change an estimation standard for occurrence of gradient illusion based on the data of the probability of occurrence of gradient illusion. For example, the gradient illusion estimation unit 30 may change a predetermined gradient, distance, time, gradient difference, or range in accordance with the probability of occurrence of the gradient illusion in the gradient illusion estimation methods described in the embodiment 2.

Modification Example 2 of Embodiment 2

The gradient illusion estimation unit 30 may acquire the gradient data detected by an inclination sensor (not shown) provided to the vehicle 1 as the gradient information of the traffic lane 6. The gradient illusion estimation unit 30 may determine whether or not the vehicle 1 has traveled more than a predetermined distance on the traffic lane 6 having a gradient steeper than a predetermined gradient based on the positional information of the vehicle 1 and the gradient data thereof.

The gradient illusion estimation unit 30 may estimate occurrence of the gradient illusion based on the gradient information of the road in front of the vehicle 1 recognized by a vicinity information detection apparatus performing image processing as described hereinafter.

Embodiment 3

Described are a drive assist apparatus, a drive assist system, and a drive assist method according to an embodiment 3. The embodiment 3 is a subordinate concept of the embodiment 1. In the embodiment 3, the same reference sign is assigned to a constituent element similar to that in the embodiment 1 or 2, and a detailed description thereof is omitted.

Figure 25:
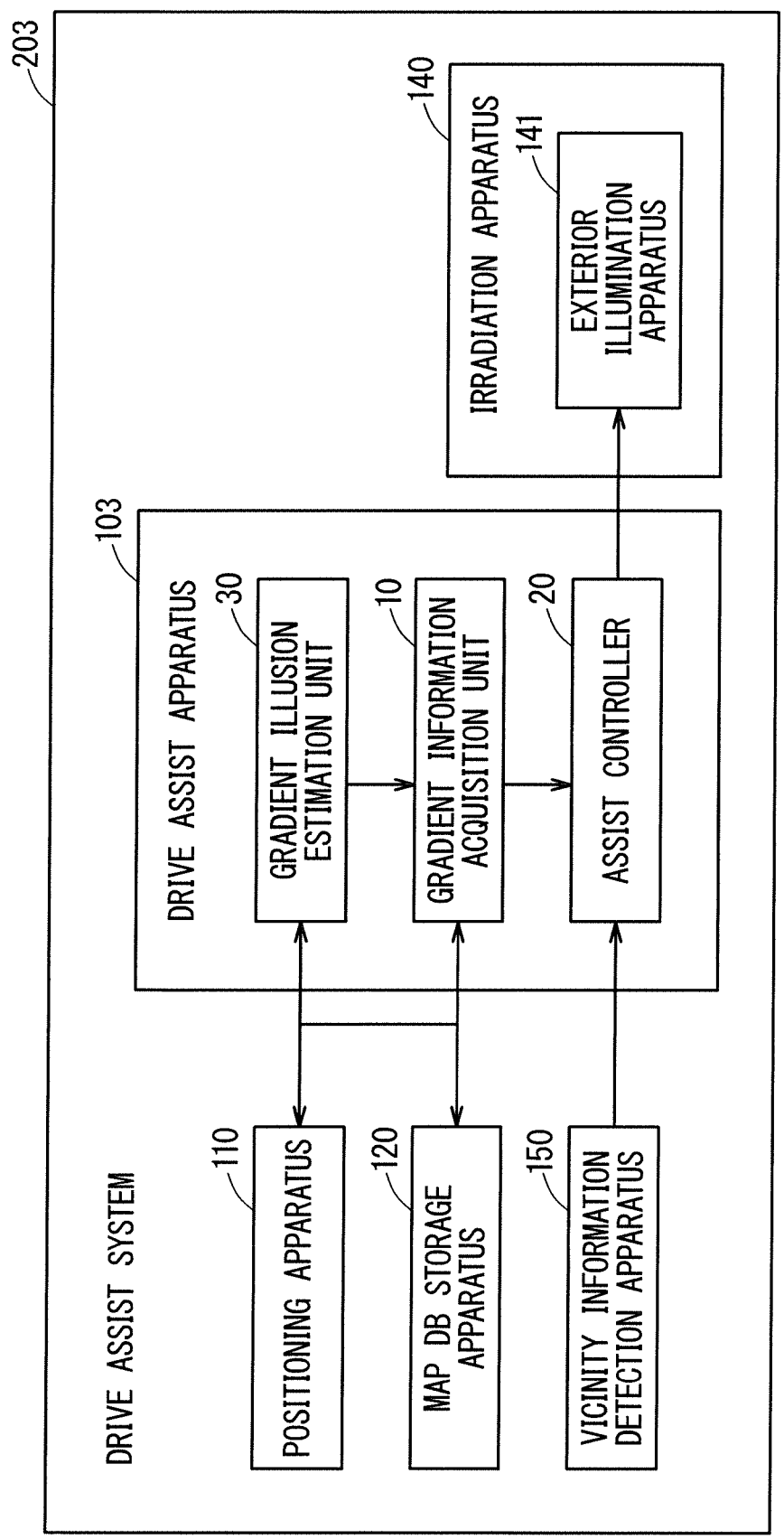
FIG. 25 A block diagram illustrating a configuration of a drive assist apparatus and a drive assist system according to an embodiment 3.

FIG. 25 is a block diagram illustrating a configuration of a drive assist apparatus 103 and a drive assist system 203 according to the embodiment 3. The drive assist system 203 includes the drive assist apparatus 103, the positioning apparatus 110, the map DB storage apparatus 120, a vicinity information detection apparatus 150, and the irradiation apparatus 140. The irradiation apparatus 140 includes the exterior illumination apparatus 141.

The vicinity information detection apparatus 150 detects vicinity information of the vehicle 1. The vicinity information detection apparatus 150 is a camera, a millimeter-wave radar, or a light detection and ranging (LIDAR) mounted to the vehicle 1, for example. The vicinity information detection apparatus 150 detects a position of a boundary line (white line, for example) and a region of the traffic lane 6 as the vicinity information of the vehicle 1 by image processing, for example. The vicinity information detection apparatus 150 detects a relative position with respect to the other vehicle traveling around the vehicle 1 as vicinity information of the vehicle 1. The other vehicle is a vehicle such as a vehicle traveling in front of the vehicle 1, a vehicle traveling an adjacent traffic lane, and a vehicle traveling an opposite traffic lane. The vicinity information detection apparatus 150 may detect a relative position with respect to a pedestrian located around the vehicle 1 in place of the other vehicle.

The assist controller 20 controls the exterior illumination apparatus 141 so that the gradient recognition pattern 5 is project in a region other than a predetermined avoidance range in the traffic lane 6 based on the vicinity information of the vehicle 1.

For example, the assist controller 20 acquires positional information of a white line of the traffic lane 6 to determine a position where the gradient recognition pattern 5 is projected. The assist controller 20 controls the exterior illumination apparatus 141 so that the gradient recognition pattern 5 is projected on the white lines on both ends of the traffic lane 6. In this case, the avoidance range is a region on the inner side of both ends of the traffic lane 6, that is to say, the center part of the traffic lane 6.

The assist controller 20 may acquire the information of the relative position with respect to the other vehicle and control the exterior illumination apparatus 141 so that the gradient recognition pattern 5 is projected in the region away from the other vehicle. In this case, the avoidance range is a region around the other vehicle.

The assist controller 20 may acquire the information of the relative position with respect to the pedestrian and control the exterior illumination apparatus 141 so that the gradient recognition pattern 5 is projected in the region away from the pedestrian. In this case, the avoidance range is a region around the pedestrian.

Such a function of the assist controller 20 is achieved by the processing circuitry illustrated in FIG. 11 or FIG. 12.

Embodiment 4

Described are a drive assist apparatus, a drive assist system, and a drive assist method according to an embodiment 4. The embodiment 4 is a subordinate concept of the embodiment 1. In the embodiment 4, the same reference sign is assigned to a constituent element similar to that in any one of the embodiments 1 to 3, and a detailed description thereof is omitted.

Figure 26:
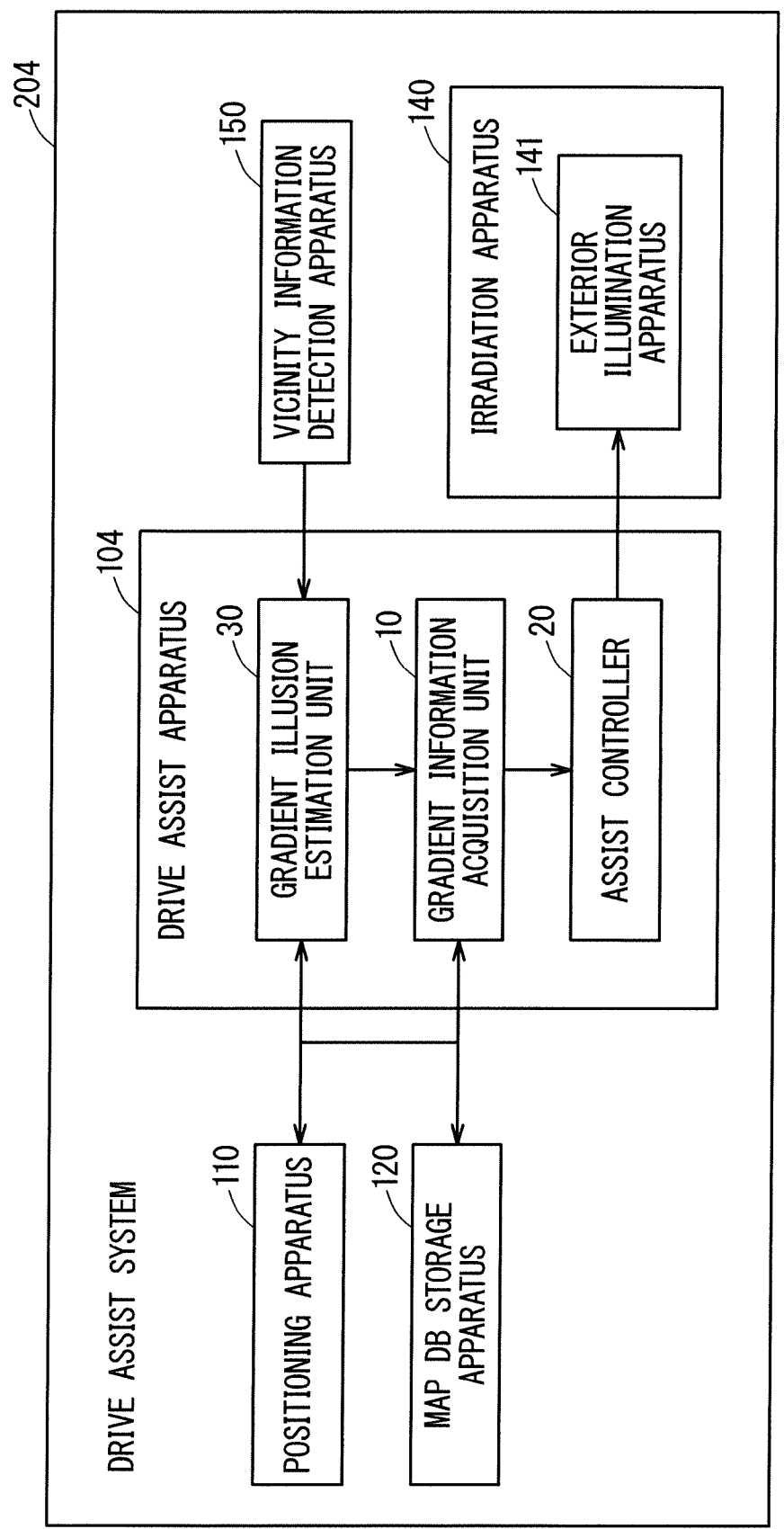
FIG. 26 A block diagram illustrating a configuration of a drive assist apparatus and a drive assist system according to an embodiment 4.

FIG. 26 is a block diagram illustrating a configuration of a drive assist apparatus 104 and a drive assist system 204 according to the embodiment 4. The drive assist system 204 includes the drive assist apparatus 104, the positioning apparatus 110, the map DB storage apparatus 120, the vicinity information detection apparatus 150, and the irradiation apparatus 140. The irradiation apparatus 140 is the exterior illumination apparatus 141.

The vicinity information detection apparatus 150 detects a feature around the vehicle 1 by image processing, for example. The feature is a movable estate or an immovable estate, and is a tree, a road installation, or a building, for example.

The gradient illusion estimation unit 30 estimates occurrence of the gradient illusion based on feature information around the vehicle 1 in addition to the positional information of the vehicle 1 and the gradient information of the road. More specifically, the gradient illusion estimation unit 30 determines whether or not a reference feature is located in front of the vehicle 1 based on the feature information. The reference feature is a feature including a vertical or horizontal line segment in an outline thereof.

When a small number of reference features are located in front of the vehicle 1, there is a high possibility of occurrence of the gradient illusion. When the number of reference features is smaller than a predetermined number thereof, the gradient illusion estimation unit 30 changes the predetermined distance in the gradient illusion estimation method described in the embodiment 2 to a smaller distance or changes the predetermined gradient to a smaller gradient. When the number of reference features is smaller than the predetermined number thereof, the gradient illusion estimation unit 30 may change a gradient illusion occurrence area in the gradient illusion estimation method described in the embodiment 2 to a larger area. That is to say, the gradient illusion estimation unit 30 may change a section where the gradient illusion easily occurs to a larger section.

The gradient illusion estimation unit 30 may determine that there is no reference feature when, by the vicinity information detection apparatus 150, (1) it is determined that the vehicle 1 travels the upslope and a large part of an area in front of the vehicle 1 is empty, (2) the vehicle 1 travels in a tunnel, or (3) a travel period of time is night and the traffic lane 6 is difficult to be detected.

When the map DB storage apparatus 120 stores the high-accuracy map DB including the feature information, the gradient illusion estimation unit 30 may acquire the feature information from the high-accuracy map DB in place of the vicinity information detection apparatus 150.

Such a function of the gradient illusion estimation unit 30 is achieved by the processing circuitry illustrated in FIG. 11 or FIG. 12.

Embodiment 5

Described are a drive assist apparatus, a drive assist system, and a drive assist method according to an embodiment 5. The embodiment 5 is a subordinate concept of the embodiment 1. In the embodiment 5, the same reference sign is assigned to a constituent element similar to that in any one of the embodiments 1 to 4, and a detailed description thereof is omitted.

Figure 27:
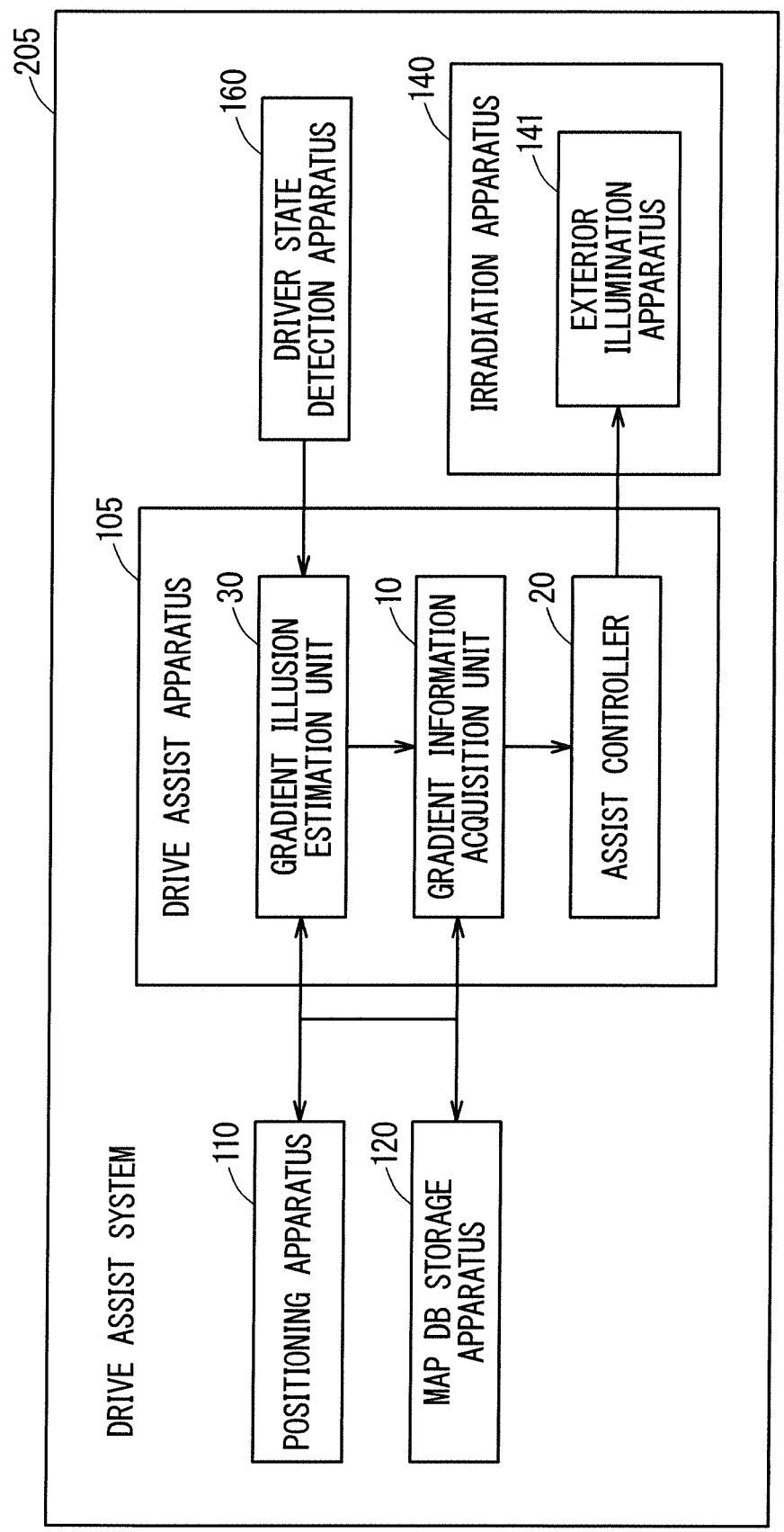
FIG. 27 A block diagram illustrating a configuration of a drive assist apparatus and a drive assist system according to an embodiment 5.

FIG. 27 is a block diagram illustrating a configuration of a drive assist apparatus 105 and a drive assist system 205 according to the embodiment 5. The drive assist system 205 includes the drive assist apparatus 105, the positioning apparatus 110, the map DB storage apparatus 120, a driver state detection apparatus 160, and the irradiation apparatus 140. The irradiation apparatus 140 includes the exterior illumination apparatus 141.

The driver state detection apparatus 160 detects a state of the driver. The state of the driver includes a physiological state and a psychological state, for example. The physiological state is based on an arousal level of the driver, for example. The psychological state relates to attentiveness and agitation of the driver, for example.

The gradient illusion estimation unit 30 estimates occurrence of the gradient illusion in the driver based on the positional information of the vehicle 1, the gradient information of the road, and the state of the driver. Alternatively, the gradient illusion estimation unit 30 estimates occurrence of the gradient illusion in the driver based on the positional information of the vehicle 1, the gradient illusion occurrence area information, and the state of the driver. More specifically, the gradient illusion estimation unit 30 estimates that the gradient illusion easily occurs as the state of the driver gets worse than a predetermined state. For example, the gradient illusion estimation unit 30 estimates that the gradient illusion easily occurs when the arousal level of the driver decreases to a level equal to or lower than a predetermined level or when a degree of fatigue of the driver increases to a degree equal to or higher than a predetermined degree. The gradient illusion estimation unit 30 may determine that the gradient illusion easily occurs when a degree of decrease in the arousal level of the driver is equal to or larger than a predetermined degree of decrease. In other words, the gradient illusion estimation unit 30 changes a determination condition for determining the occurrence of gradient illusion in accordance with the state of the driver.

Such a function of the gradient illusion estimation unit 30 is achieved by the processing circuitry illustrated in FIG. 11 or FIG. 12.

Modification Example of Embodiment 5

The driver state detection apparatus 160 stores drive history information of the driver. The drive history information includes an age of the driver and a drive operation history, for example. The drive operation history includes history information of an erroneous operation such as erroneous starting, driving in a wrong direction, and stray driving, for example. The erroneous operation includes a drive operation of misunderstanding by the driver.

The gradient illusion estimation unit 30 estimates occurrence of the gradient illusion in the driver based on the positional information of the vehicle 1, the gradient information of the road, and the drive history information of the driver. Alternatively, the gradient illusion estimation unit 30 estimates occurrence of the gradient illusion in the driver based on the positional information of the vehicle 1, the gradient illusion occurrence area information, and the drive history information of the driver. More specifically, the gradient illusion estimation unit 30 determines that the gradient illusion easily occurs as the number of erroneous operation of the driver gets larger than a predetermined standard. In other words, the gradient illusion estimation unit 30 changes a determination condition for estimating the occurrence of gradient illusion in accordance with the drive history information of the driver.

Such a function of the gradient illusion estimation unit 30 is achieved by the processing circuitry illustrated in FIG. 11 or FIG. 12.

Embodiment 6

Described are a drive assist apparatus, a drive assist system, and a drive assist method according to an embodiment 6. The embodiment 6 is a subordinate concept of the embodiment 1. In the embodiment 6, the same reference sign is assigned to a constituent element similar to that in any one of the embodiments 1 to 5, and a detailed description thereof is omitted.

Figure 28:
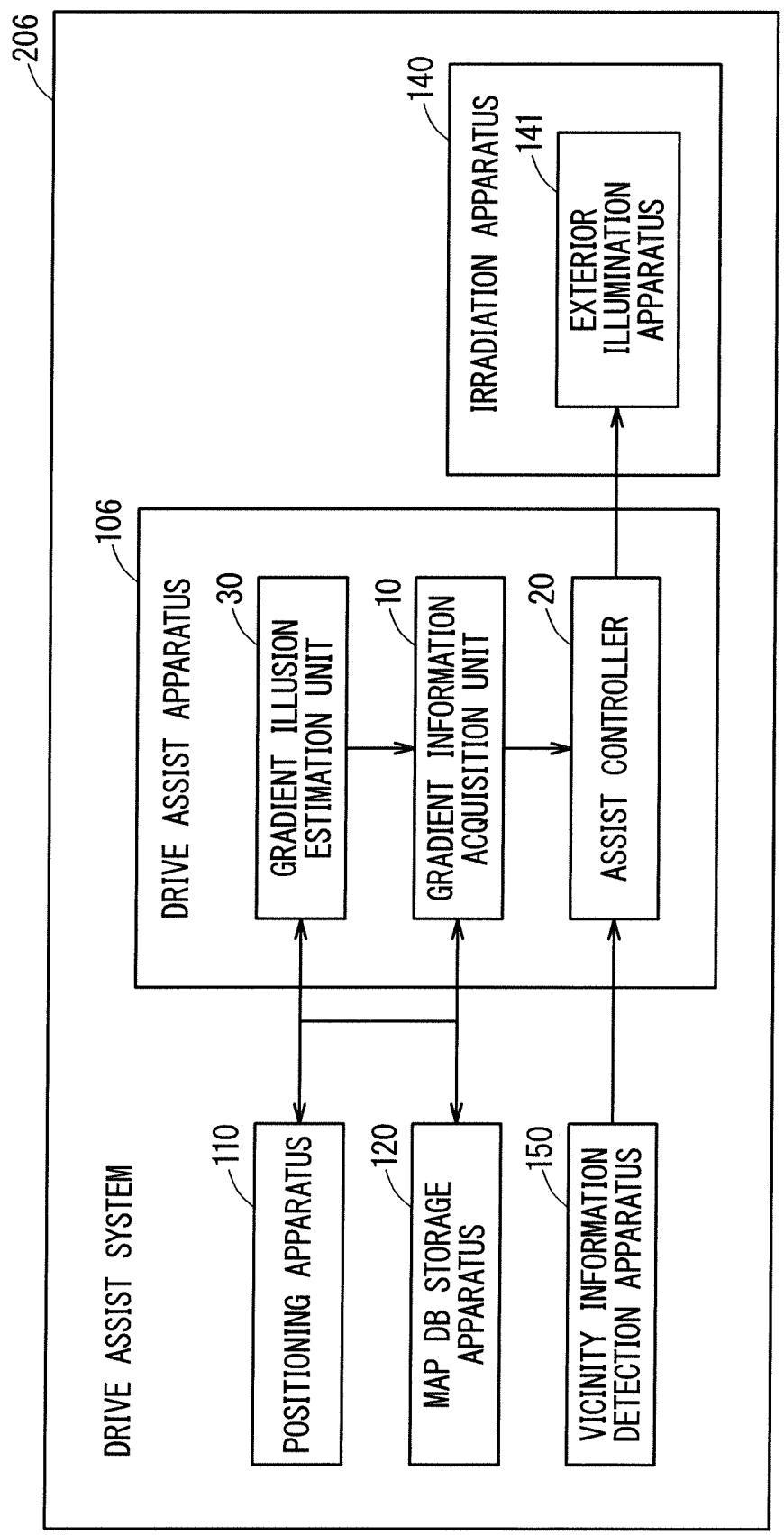
FIG. 28 A block diagram illustrating a configuration of a drive assist apparatus and a drive assist system according to an embodiment 6.

FIG. 28 is a block diagram illustrating a configuration of a drive assist apparatus 106 and a drive assist system 206 according to the embodiment 6. The drive assist system 206 includes the drive assist apparatus 106, the positioning apparatus 110, the map DB storage apparatus 120, the vicinity information detection apparatus 150, and the irradiation apparatus 140. The irradiation apparatus 140 includes the exterior illumination apparatus 141.

The vicinity information detection apparatus 150 detects a sidewall provided along a road. The vicinity information detection apparatus 150 recognizes a size and position of the sidewall by image processing, for example. The sidewall is a soundproof wall, a sidewall of a tunnel, an open-cut mountain surface, a road structure, for example. It is sufficient that the sidewall is a feature on which the gradient recognition pattern 5 can be projected. The vicinity information detection apparatus 150 or the assist controller 20 determines whether or not the gradient recognition pattern 5 can be projected on the sidewall.

The assist controller 20 acquires information of the sidewall from the vicinity information detection apparatus 150. The assist controller 20 performs control on the exterior illumination apparatus 141 so that the exterior illumination apparatus 141 projects the gradient recognition pattern 5 on the sidewall. The gradient recognition pattern 5 is similar to the pattern illustrated in each of FIG. 15 to FIG. 23. However, one of a pair of patterns is projected on the sidewall in the embodiment 6. For example, when the sidewall is detected on the left side of the vehicle 1, the assist controller 20 controls the exterior illumination apparatus 141 so that the exterior illumination apparatus 141 projects a pattern of the left row on the sidewall. When the target object is a sidewall of a tunnel, the assist controller 20 controls the exterior illumination apparatus 141 so that the exterior illumination apparatus 141 projects the gradient recognition pattern 5 on the sidewall in an eye-catching color with respect to a color of illumination in the tunnel. The assist controller 20 may control the exterior illumination apparatus 141 so that the exterior illumination apparatus 141 projects the gradient recognition pattern 5 on not only the sidewall but also a road surface. The assist controller 20 may control the exterior illumination apparatus 141 so that the gradient recognition pattern 5 is not projected on the other vehicle based on the information of the relative position with respect to the other vehicle.

Such a function of the assist controller 20 is achieved by the processing circuitry illustrated in FIG. 11 or FIG. 12.

Figure 29:
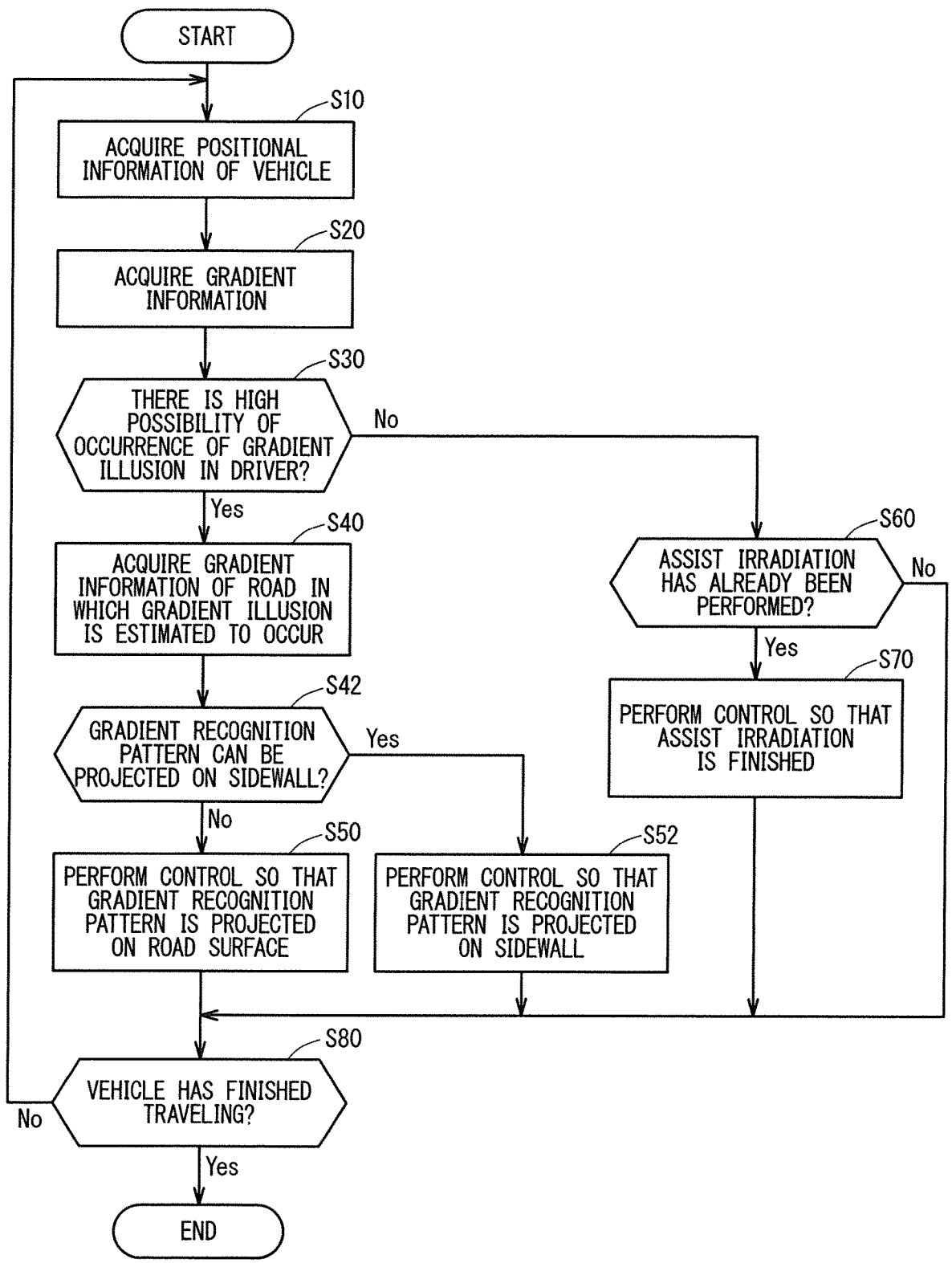
FIG. 29 A flow chart illustrating a drive assist method according to the embodiment 6.

FIG. 29 is a flow chart illustrating a drive assist method according to the embodiment 6. Steps S10 to S40 are similar to those in the embodiment 2. Step S42 is executed after Step S40.

In Step S42, the assist controller 20 determines whether or not the gradient recognition pattern 5 can be projected on the sidewall based on the information of the sidewall. When the gradient recognition pattern 5 cannot be projected, Step S50 is executed. When the gradient recognition pattern 5 can be projected, Step S52 is executed.

In Step S50, the assist controller 20 performs control on the exterior illumination apparatus 141 so that the exterior illumination apparatus 141 projects the gradient recognition pattern 5 on the road surface. This Step S50 is similar to Step S50 in the embodiment 2.

In Step S52, the assist controller 20 performs control on the exterior illumination apparatus 141 so that the exterior illumination apparatus 141 projects the gradient recognition pattern 5 on the sidewall. At this time, the assist controller 20 determines the gradient recognition pattern 5 and the position and range where the gradient recognition pattern 5 is projected. The exterior illumination apparatus 141 performs an assist irradiation in accordance with control of the assist controller 20, that is to say, projects the gradient recognition pattern 5 on the sidewall.

Steps S60 to S80 are similar to those in the embodiment 2.

When the map DB storage apparatus 120 stores the high-accuracy map DB including the information of the sidewall, the assist controller 20 may acquire the positional information of the sidewall from the high-accuracy map DB in place of the vicinity information detection apparatus 150.

Modification Example of Embodiment 6

Figure 30:
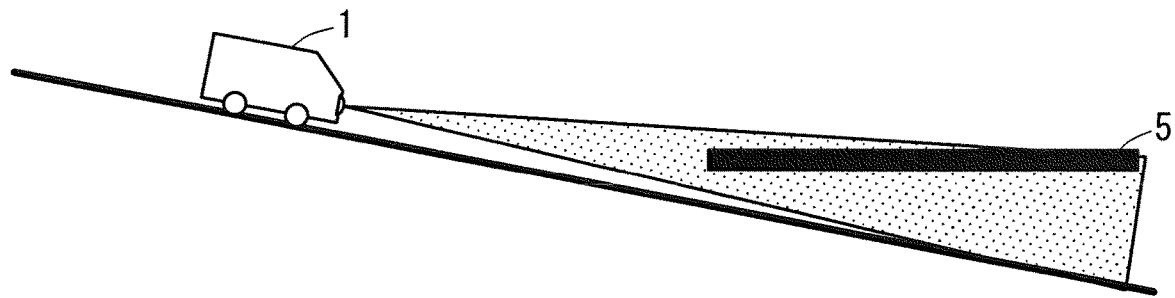
FIG. 30 A diagram illustrating an example of a gradient recognition pattern.
Figure 31:
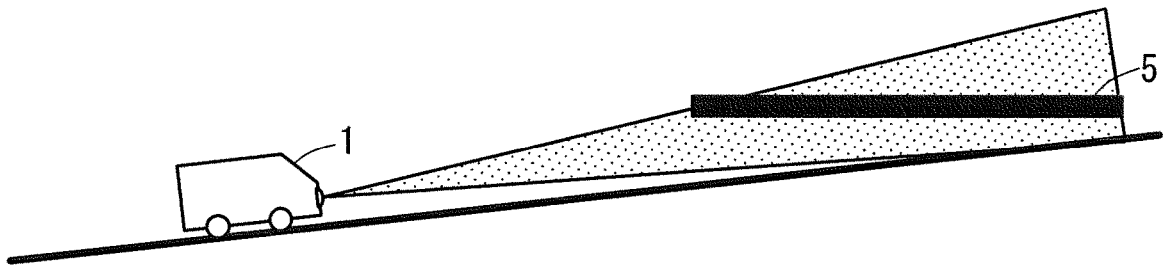
FIG. 31 A diagram illustrating an example of a gradient recognition pattern.
Figure 32:
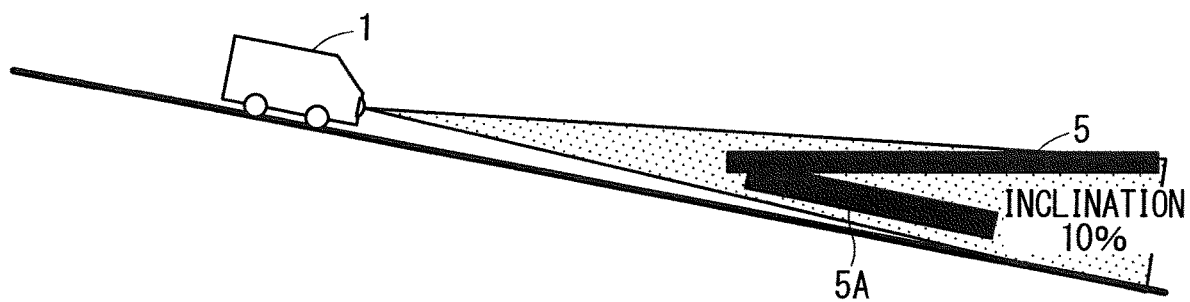
FIG. 32 A diagram illustrating an example of a gradient recognition pattern.

The gradient recognition pattern 5 on the sidewall is different from the gradient recognition pattern 5 on the road surface. For example, the gradient recognition pattern 5 on the sidewall includes a line segment closer to a horizontal line than a gradient of the road surface. The inclination of the line segment is preferably half the gradient of the road or less. For example, when the gradient of the road is downward 5%, the inclination of the line segment of the gradient recognition pattern 5 is equal to or larger than 0 and equal to or smaller than 2.5%. FIG. 30 to FIG. 32 are diagrams each illustrating an example of the gradient recognition pattern 5. FIG. 30 and FIG. 32 illustrate the gradient recognition pattern 5 in a case where the road is a downslope. FIG. 31 illustrates the gradient recognition pattern 5 in a case where the road is an upslope.

The gradient recognition pattern 5 illustrated in FIG. 30 and FIG. 31 includes a line segment closer to a horizontal line than a gradient of the road surface. The gradient recognition pattern 5 illustrated in FIG. 32 includes a road gradient line 5A in addition to the line segment. The road gradient line 5A is made up of a line segment parallel to the road surface. The gradient recognition pattern 5 may include a character pattern based on the gradient information In FIG. 32, characters of "INCLINATION 10%" is projected on the sidewall.

Figure 33:
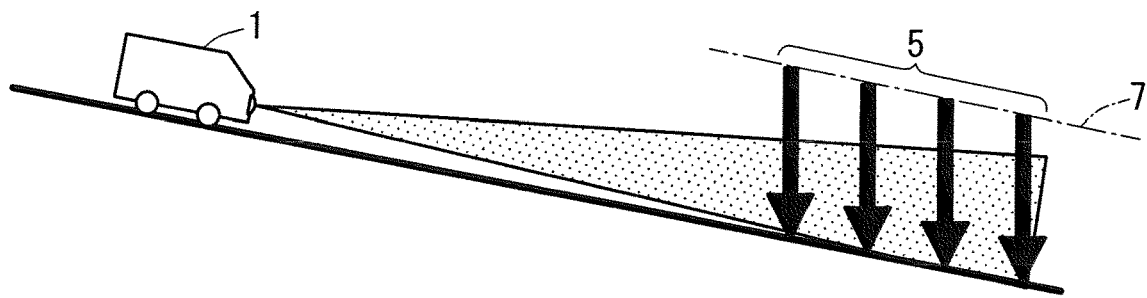
FIG. 33 A diagram illustrating an example of a gradient recognition pattern.
Figure 34:
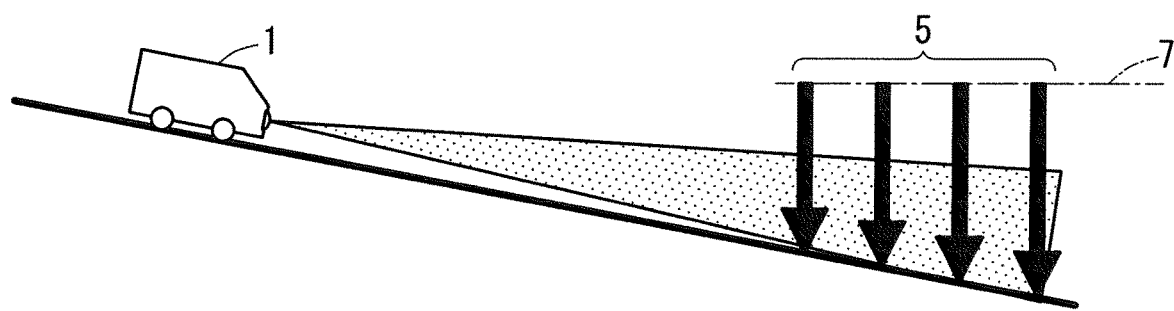
FIG. 34 A diagram illustrating an example of a gradient recognition pattern.
Figure 35:
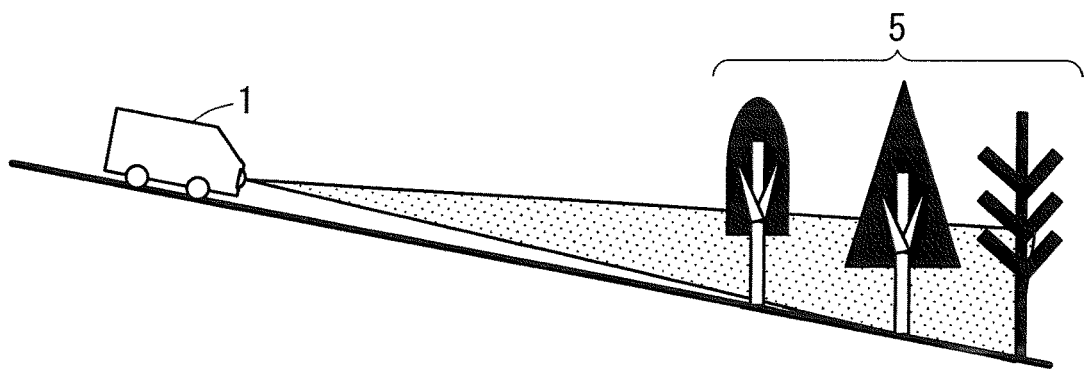
FIG. 35 A diagram illustrating an example of a gradient recognition pattern.

The gradient recognition pattern 5 on the sidewall may include a line segment closer to a plumb line than an inclination of a vertical line with respect to the road surface, for example. The plumb line is a line indicating a gravity direction. The inclination of the line segment is preferably half an angle between the vertical line and the plumb line or less. FIG. 33 to FIG. 35 are diagrams each illustrating an example of the gradient recognition pattern 5. In any of these diagrams, the vehicle 1 travels the downslope.

The gradient recognition pattern 5 illustrated in FIG. 33 includes a plurality of arrows close to the plumb line. A start end of each of the plurality of arrows is located along a reference line 7 parallel to the road surface. A direction of the arrow indicates a direction of the gradient. When the road is the downslope, the arrow is directed downward, and when the road is the upslope, the arrow is directed upward. A graphic of the gradient recognition pattern 5 is not limited to the plurality of arrows, but one arrow is also applicable. An outline of the arrow is not limited to an outline illustrated in FIG. 33 as long as it includes the line segment close to the plumb line.

The gradient recognition pattern 5 illustrated in FIG. 34 includes a plurality of arrows close to the plumb line in the manner similar to FIG. 33. A start end of each of the plurality of arrows is located along the reference line 7 closer to a horizontal line than the gradient of the road surface. In FIG. 34, the start end of each of the plurality of arrows is aligned in a horizontal direction. The road is the downslope, thus a length of the arrow is longer with increasing distance from the vehicle 1. Thus, it is emphasized that the road is the downslope. When the road is the upslope, a length of the arrow is shorter with increasing distance from the vehicle 1. In the similar manner, it is emphasized that the road is the upslope.

The gradient recognition pattern 5 illustrated in FIG. 35 includes a graphic in which a plurality of trees are deformed. The gradient recognition pattern 5 is not limited to the graphics of the plurality of trees, but a graphic of one tree is also applicable. The graphics of the plurality of trees may be the same as or different from each other. For example, each of the graphics of the plurality of trees may have a height and size different from each other.

Although illustration is omitted, the gradient recognition pattern 5 may include a graphic in which an artificial object such as a street lamp is deformed instead of a natural object such as a tree. It is sufficient that the deformed graphic includes a line segment close to the plumb line.

It is also applicable that the assist controller 20 controls the exterior illumination apparatus 141 so that the exterior illumination apparatus 141 projects the gradient recognition pattern 5 in a warning color when the road is the downslope and in a color different from the warning color when the road is the upslope. The warning color is an eye-catching color such as red or orange. The color different from the warning color is a complementary color of the warning color such as blue or green. A projection form may be different between a near side and a far side of the gradient change point 2. For example, a graphic or an animation reminding the driver of warning may be projected on the traffic lane 6 on a far side of the gradient change point 2. The graphic reminding the driver of warning is a graphic larger than that on a near side of the gradient change point 2 or a graphic including an acute angle.

The gradient recognition pattern 5 projected on the sidewall is not limited to the graphic described above. It is sufficient that the graphic constituting the gradient recognition pattern 5 includes at least one of a line segment closer to the horizontal line than the gradient of the road surface and/or a line segment closer to the plumb line than the inclination of the vertical line with respect to the road surface.

Embodiment 7

Described are a drive assist apparatus, a drive assist system, and a drive assist method according to an embodiment 7. The embodiment 7 is a subordinate concept of the embodiment 1. In the embodiment 7, the same reference sign is assigned to a constituent element similar to that in any one of the embodiments 1 to 6, and a detailed description thereof is omitted.

Figure 36:
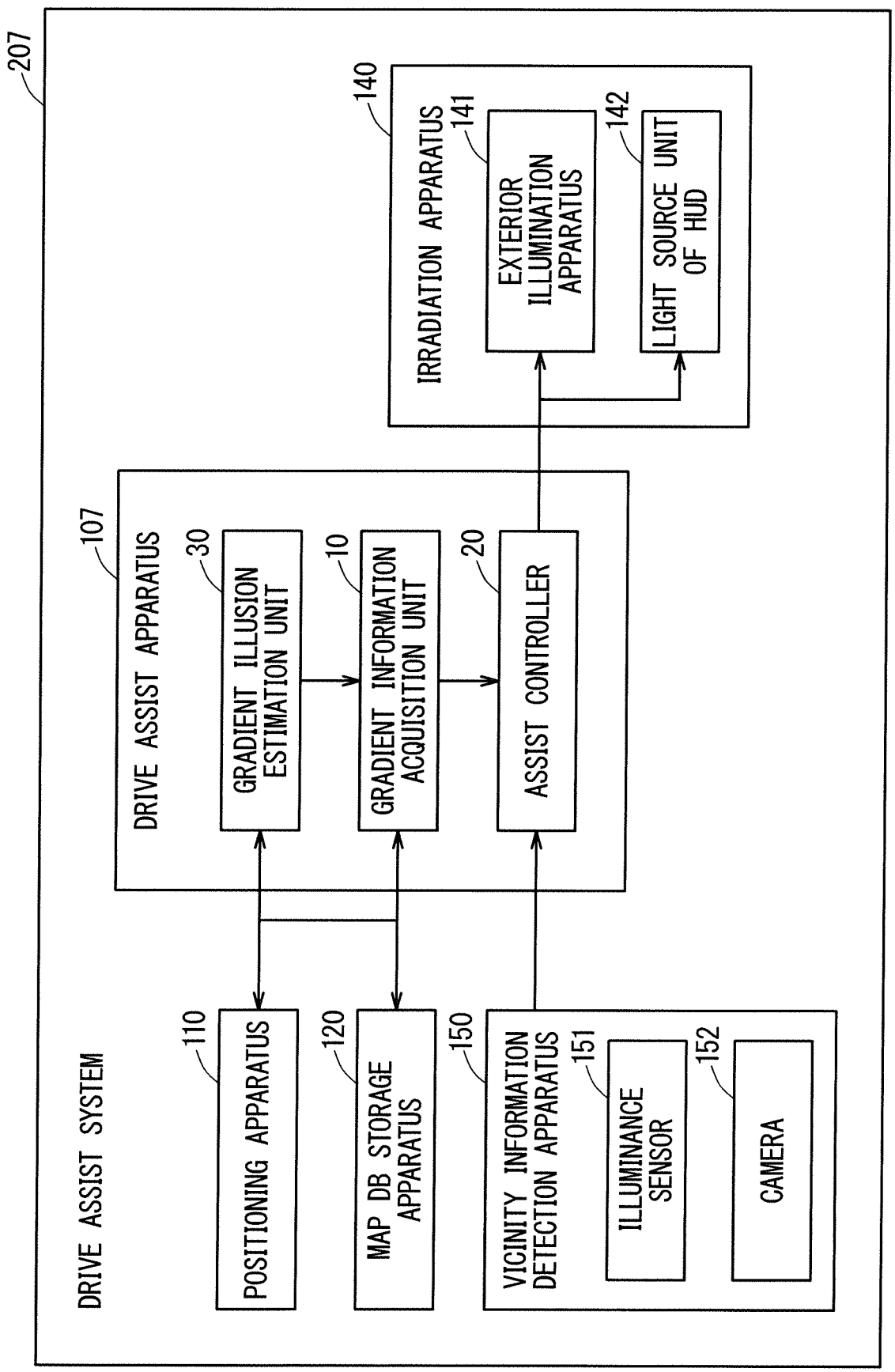
FIG. 36 A block diagram illustrating a configuration of a drive assist apparatus and a drive assist system according to an embodiment 7.

FIG. 36 is a block diagram illustrating a configuration of a drive assist apparatus 107 and a drive assist system 207 according to the embodiment 7. The drive assist system 207 includes the drive assist apparatus 107, the positioning apparatus 110, the map DB storage apparatus 120, the vicinity information detection apparatus 150, and the irradiation apparatus 140.

The vicinity information detection apparatus 150 includes an illuminance sensor 151. The illuminance sensor 151 is mounted to the vehicle 1 to detect illuminance around the vehicle 1 as the vicinity information of the vehicle 1.

The irradiation apparatus 140 includes the exterior illumination apparatus 141 and a light source unit 142 of the HUD. The HUD is provided inside the vehicle 1. The light source unit 142 of the HUD projects a display object on a projection surface. The projection surface may be a screen of the HUD or a front window of the vehicle 1.

The assist controller 20 performs control on the light source unit 142 of the HUD so that the light source unit 142 of the HUD projects the gradient recognition pattern 5 on the projection surface provided in front of the driver seat of the vehicle 1. When the gradient recognition pattern 5 is projected on the projection surface, the graphic constituting the gradient recognition pattern 5 is referred to as the display object. The assist controller 20 determines a position of the display object on the projection surface so that the display object is displayed in overlapped fashion with a target object via the projection surface. That is to say, the assist controller 20 performs control on the light source unit 142 of the HUD so that the light source unit 142 of the HUD displays the gradient recognition pattern 5 in overlapped fashion with the target object.

The assist controller 20 according to the embodiment 7 determines whether the gradient recognition pattern 5 is projected on the target object by the exterior illumination apparatus 141 or the gradient recognition pattern 5 is projected on the projection surface by the light source unit 142 of the HUD, based on a predetermined condition. The predetermined condition is a condition regarding illuminance around the vehicle 1, for example.

Such a function of the assist controller 20 is achieved by the processing circuitry illustrated in FIG. 11 or FIG. 12.

Figure 37:
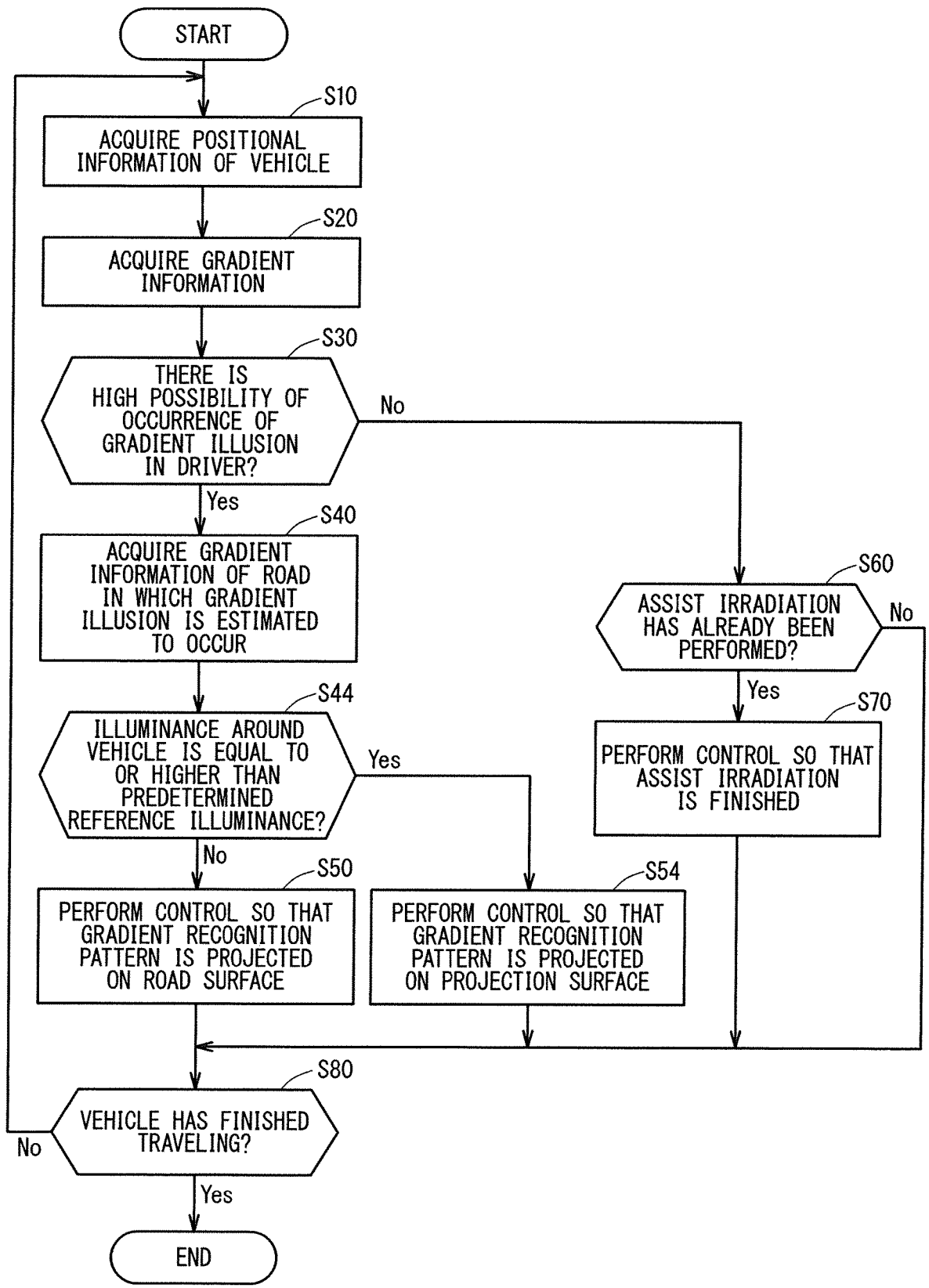
FIG. 37 A flow chart illustrating a drive assist method according to the embodiment 7.

FIG. 37 is a flow chart illustrating a drive assist method according to the embodiment 7. Steps S10 to S40 are similar to those in the embodiment 2. Step S44 is executed after Step S40.

In Step S44, the assist controller 20 determines whether or not the illuminance around the vehicle 1 is equal or higher than a predetermined reference illuminance. The reference illuminance is illuminance in which illumination by a headlight of the vehicle 1 is necessary, and is approximately 100 lux, for example.

The reference illuminance is illuminance corresponding to luminance of the gradient recognition pattern 5 projected by the exterior illumination apparatus 141. For example, the reference illuminance used for the determination described above is set to have a higher value as the luminance of the gradient recognition pattern 5 gets higher. That is to say, even when the illuminance around the vehicle 1 is high, the gradient recognition pattern 5 projected at high brightness is clearly recognized by the driver, thus the reference illuminance used for the determination described above is set to have the high value.

The reference illuminance may be illuminance corresponding to a projection position of the gradient recognition pattern 5 projected by the exterior illumination apparatus 141. For example, the reference illuminance used for the determination described above is set to have a higher value as the projection position is closer to the vehicle 1. That is to say, even when the illuminance around the vehicle 1 is high, the gradient recognition pattern 5 projected close to the vehicle 1 is clearly recognized by the driver, thus the reference illuminance used for the determination described above is set to have the high value.

When the illuminance around the vehicle 1 is smaller than the reference illuminance in this Step S44, Step S50 is executed. When the illuminance around the vehicle 1 is equal to or higher than the reference illuminance, Step S54 is executed.

In Step S50, the assist controller 20 performs control on the exterior illumination apparatus 141 so that the exterior illumination apparatus 141 projects the gradient recognition pattern 5 on the road surface. This Step S50 is similar to Step S50 in the embodiment 2.

In Step S54, the assist controller 20 performs control on the light source unit 142 of the HUD so that the light source unit 142 of the HUD projects the gradient recognition pattern 5 on the projection surface to display the gradient recognition pattern 5 in overlapped fashion with the target object. At this time, the assist controller 20 determines the gradient recognition pattern 5 and the position and range where the gradient recognition pattern 5 is projected. The light source unit 142 of the HUD performs an assist irradiation in accordance with control of the assist controller 20. For example, any one of the gradient recognition patterns 5 illustrated in FIG. 10 and FIG. 15 to FIG. 23 is projected on the projection surface. The graphic of the gradient recognition pattern 5 on the projection surface, that is to say, the display object is displayed in overlapped fashion with the boundary line (white line, for example) of the traffic lane 6 in front of the driver.

Steps S60 to S80 are similar to those in the embodiment 2.

Modification Example 1 of Embodiment 7

It is also applicable that the assist controller 20 performs control on the exterior illumination apparatus 141 so that the exterior illumination apparatus 141 projects the gradient recognition pattern 5 on the target object and performs control on the light source unit 142 of the HUD so that the light source unit 142 of the HUD projects the gradient recognition pattern 5 on the projection surface. The gradient recognition pattern 5 is projected on both the target object in front of the vehicle 1 and the projection surface in front of the driver seat.

Modification Example 2 of Embodiment 7

The predetermined condition may be a condition regarding ON and OFF of the headlight of the vehicle 1. When the headlight is ON, the assist controller 20 controls the exterior illumination apparatus 141 so that the assist irradiation is executed. When the headlight is OFF, the assist controller 20 controls the light source unit 142 of the HUD so that the assist irradiation is executed.

The predetermined condition may be a condition set by a user. In other words, the driver can select whether the assist irradiation is executed by the exterior illumination apparatus 141 or the assist irradiation is executed by the light source unit 142 of the HUD.

Modification Example 3 of Embodiment 7

When the gradient recognition pattern 5 is projected on the projection surface, the assist controller 20 performs control so that a virtual image distance of the display object of the gradient recognition pattern 5 coincides with an actual image distance of the target object. The virtual image distance is a distance from an eye of the driver to a virtual image of the display object. The actual image distance is a distance from an eye of the driver to an actual image of the target object. A position of the eye of the driver is detected by a detection apparatus such as a driver monitoring system, for example. The position of the eye of the driver may be one point over the driver seat estimated based on information of a position of the driver seat and an inclination thereof.

According to such control, the display object of the gradient recognition pattern 5 is displayed on the projection surface to be overlapped with the target object located outside the vehicle 1.

Modification Example 4 of Embodiment 7

The HUD has a three-dimensional stereoscopic display function. The assist controller 20 performs control on the light source unit 142 of the HUD so that the light source unit 142 of the HUD projects the gradient recognition pattern 5 on the projection surface in three-dimensional stereoscopic display. The HUD projects the line segment, the arrow, the graphic of the tree, or the like illustrated in FIG. 30 to FIG. 35 on the projection surface as a three-dimensional display object, for example. The driver perceives a depth of the display object. As a result, even when there is no sidewall of the road, the driver perceives the depth of the display object and recognizes a horizontal or vertical direction of a space.

Modification Example 5 of Embodiment 7

The vicinity information detection apparatus 150 includes a camera 152 as illustrated in FIG. 36. The vicinity information detection apparatus 150 processes an image taken by the camera 152 to detect a relative position of the vehicle 1 with respect to the other vehicle around the vehicle 1 or a relative position of the vehicle 1 with respect to a pedestrian around the vehicle 1 as the vicinity information of the vehicle 1. A millimeter-wave radar or a LIDAR, for example, may be mounted to the vehicle 1 as the vicinity information detection apparatus 150 in place of the camera 152.

The assist controller 20 determines whether or not the gradient recognition pattern 5 is projected on the other vehicle or the pedestrian based on the information of those relative positions. When the gradient recognition pattern 5 is projected on the other vehicle or the pedestrian, the assist controller 20 determines to project the gradient recognition pattern 5 by the light source unit 142 of the HUD.

Modification Example 6 of Embodiment 7

The assist controller 20 controls the light source unit 142 of the HUD so that the gradient recognition pattern 5 is projected on a region other than a predetermined avoidance range. The avoidance range is range within a predetermined avoidance distance from the front end of the vehicle 1. The display object is not displayed in overlapped fashion with the target object in the avoidance range, thus the driver can easily recognize an area in front of the vehicle 1.

Embodiment 8

The drive assist apparatus described in each embodiment described above can also be applied to a system made up by appropriately combining a navigation device mounted to the vehicle 1, a communication terminal, a server, and functions of applications installed therein. Herein, the navigation device includes a portable navigation device (PND), for example. The communication terminal includes a mobile terminal such as a mobile phone, a smartphone, and a tablet, for example.

Figure 38:
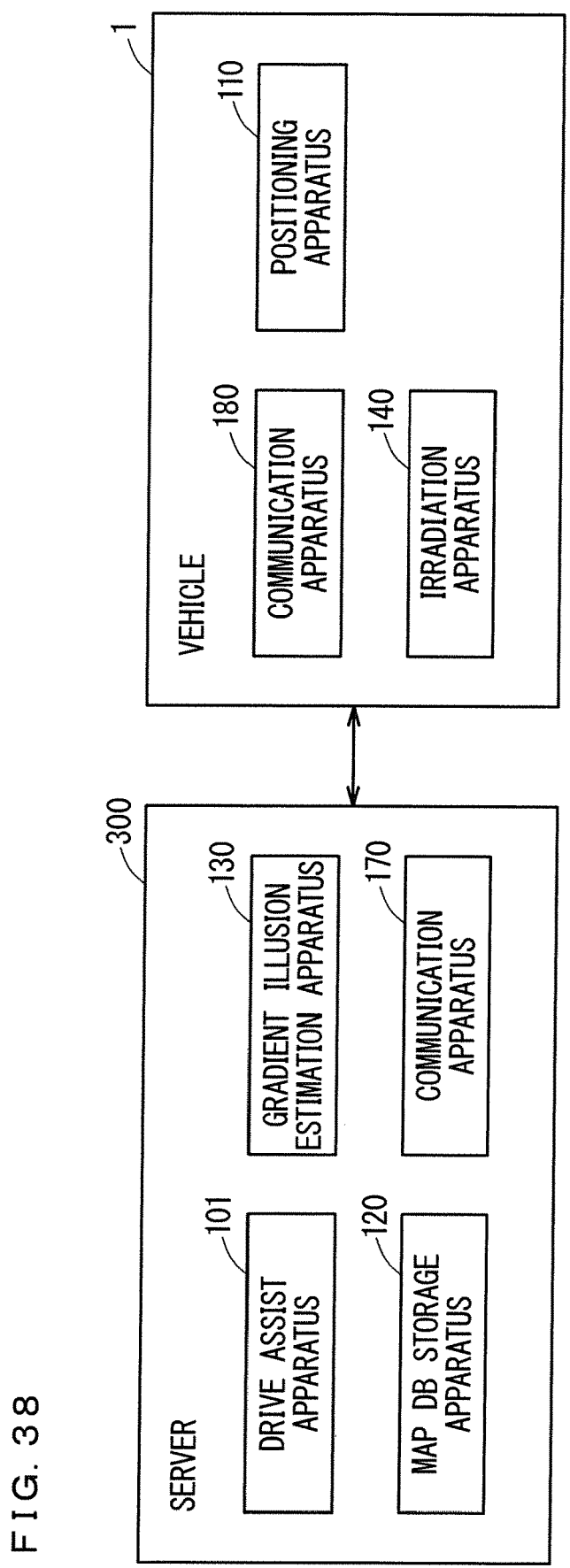
FIG. 38 A functional block diagram illustrating a configuration of a drive assist apparatus according to an embodiment 8 and apparatuses operating in relation to the drive assist apparatus.

FIG. 38 is a functional block diagram illustrating a configuration of a drive assist apparatus 101 according to an embodiment 8 and apparatuses operating in relation to the drive assist apparatus 101.

A server 300 is provided with the drive assist apparatus 101, the gradient illusion estimation apparatus 130, the map DB storage apparatus 120, and a communication apparatus 170. The gradient illusion estimation apparatus 130 estimates occurrence of the gradient illusion in the driver based on the positional information of the vehicle 1 detected by the positioning apparatus 110 and the gradient information of the road stored in the map DB storage apparatus 120. The drive assist apparatus 101 acquires the gradient information of the road in which the gradient illusion is estimated to occur in the driver from the map DB storage apparatus 120, for example. The drive assist apparatus 101 performs control on the irradiation apparatus 140 of the vehicle 1 via the communication apparatus 170 and the communication apparatus 180 so that the irradiation apparatus 140 of the vehicle 1 projects the gradient recognition pattern 5 on the target object. Alternatively, the drive assist apparatus 101 performs control on the irradiation apparatus 140 of the vehicle 1 via the communication apparatus 170 and the communication apparatus 180 so that the irradiation apparatus 140 of the vehicle 1 projects the gradient recognition pattern 5 on the projection surface provided in front of the driver seat of the vehicle 1 to display the gradient recognition pattern 5 in overlapped fashion with the target object.

The drive assist apparatus 101 is disposed in the server 300, thus the configuration of the in-vehicle apparatus is simplified.

It is also applicable that some of the functions or constituent elements of the drive assist apparatus 101 are provided to the server 300 and the other some thereof are provided to the vehicle 1, thus they maybe dispersedly disposed.

According to the present disclosure, each embodiment can be appropriately varied or omitted.

According to the present disclosure, each embodiment can be arbitrarily combined, or each embodiment can be appropriately varied or omitted.

EXPLANATION OF REFERENCE SIGNS 1 vehicle, 2 gradient change point, 3 main lane, 4 branch lane, 5 gradient recognition pattern, 5A road gradient line, 6 traffic lane, 7 reference line, 10 gradient information acquisition unit, 20 assist controller, 30 gradient illusion estimation unit, 90 processing circuit, 91 processor, 92 memory, 101 to 107 drive assist apparatus, 110 positioning apparatus, 120 map DB storage apparatus, 130 gradient illusion estimation apparatus, 140 irradiation apparatus, 141 exterior illumination apparatus, 142 light source unit, 150 vicinity information detection apparatus, 151 illuminance sensor, 152 camera, 160 driver state detection apparatus, 170 communication apparatus, 180 communication apparatus, 202 to 207 drive assist system, 300 server.

The invention claimed is:

1. A drive assist apparatus, comprising processing circuitry to:
acquire gradient information of a road in which gradient illusion is estimated to occur in a driver of a vehicle, and
perform control on an irradiation apparatus provided to the vehicle so that the irradiation apparatus projects:
by an illumination apparatus, a gradient recognition pattern including at least one graphic, based on the gradient information of the road, disposed along an extension direction of a target object, which is located in front and outside of the vehicle and extending along the road, on the target object, and
by a lighting source, the at least one graphic of the gradient recognition pattern on a projection surface provided in front of a seat for the driver of the vehicle and inside of the vehicle to display the at least one graphic of the gradient recognition pattern in overlapped fashion with the target object, and
control the irradiation apparatus based on a predetermined condition so that the irradiation apparatus projects the gradient recognition pattern on the target object, and displays the at least one graphic of the gradient recognition pattern in overlapped fashion with the target object.

2. The drive assist apparatus according to claim 1, wherein
the irradiation apparatus includes:
the illumination apparatus to directly project the gradient recognition pattern on the target object;
the light source of a head-up display (HUD) to project the gradient recognition pattern on the projection surface, and
the processing circuitry to determine whether the gradient recognition pattern is projected on the target object by the illumination apparatus or the gradient recognition pattern is projected on the projection surface by the light source of the HUD, based on the predetermined condition.

3. The drive assist apparatus according to claim 2, wherein
the HUD is to perform three-dimensional stereoscopic display, and
the processing circuitry is to perform the control on the light source of the HUD so that the three-dimensional stereoscopic display as the gradient recognition pattern is projected on the projection surface.

4. The drive assist apparatus according to claim 1, wherein
the target object includes a road surface of the road, and
the gradient recognition pattern is projected in a region other than a predetermined avoidance range, the predetermined avoidance range being based on a region of a traffic lane of the vehicle.

5. The drive assist apparatus according to claim 1, wherein
the processing circuitry is to perform the control on the irradiation apparatus so that the gradient recognition pattern is not projected on a second vehicle around a first vehicle based on vicinity information of the first vehicle as the vehicle.

6. The drive assist apparatus according to claim 1, wherein
the target object includes a sidewall provided along the road, and the processing circuitry is to perform control on the illumination apparatus so that the illumination apparatus projects the gradient recognition pattern on the target object.

7. The drive assist apparatus according to claim 6, wherein the sidewall is a sidewall of a tunnel.

8. The drive assist apparatus according to claim 6, wherein
the target object includes a road surface of the road, and
the gradient recognition pattern on the sidewall is different from the gradient recognition pattern on the road surface.

9. The drive assist apparatus according to claim 6, wherein
the gradient recognition pattern on the sidewall includes a line segment closer to a horizontal line than a gradient of a road surface of the road as the at least one graphic.

10. The drive assist apparatus according to claim 6, wherein
the gradient recognition pattern on the sidewall includes a line segment closer to a plumb line indicating a gravity direction than an inclination of a vertical line with respect to a road surface of the road as the at least one graphic.

11. The drive assist apparatus according to claim 1, wherein
the at least one graphic of the gradient recognition pattern includes a graphic corresponding to an angle of a gradient of the road.

12. The drive assist apparatus according to claim 1, wherein
the gradient recognition pattern projected on a first point on a near side of a gradient change point where a gradient of the road changes is different from the gradient recognition pattern projected on a second point on a far side of the gradient change point.

13. The drive assist apparatus according to claim 1, wherein
the target object includes a road surface of the road,
the gradient recognition pattern includes a plurality of line segments extending along each of both ends of a traffic lane of the road as the at least one graphic,
when the road is horizontal, the plurality of line segments are parallel to each other,
when the road has a downward gradient, intervals of the plurality of line segments narrow with increasing distance from the vehicle, and
when the road has an upward gradient, intervals of the plurality of line segments widen with increasing distance from the vehicle.

14. The drive assist apparatus according to claim 1, wherein
the target object includes a road surface of the road,
the gradient recognition pattern has a polygonal shape projected along each of both ends of a traffic lane of the road as the at least one graphic,
the polygonal shape includes a first side located close to the vehicle and a second side located far away from the vehicle,
when the road is horizontal, a length of the first side is a same as a length of the second side,
when the road has a downward gradient, the first side is longer than the second side, and
when the road has an upward gradient, the first side is shorter than the second side.

15. The drive assist apparatus according to claim 1, wherein
the processing circuitry is further to estimate occurrence of the gradient illusion in the driver based on positional information of the vehicle and the gradient information of the road.

16. The drive assist apparatus according to claim 1, wherein
the processing circuitry is further to estimate occurrence of the gradient illusion in the driver based on positional information of the vehicle and gradient illusion occurrence area information indicating that gradient illusion has occurred before.

17. The drive assist apparatus according to claim 1, wherein
the processing circuitry is further to estimate occurrence of the gradient illusion in the driver based on:
positional information of the vehicle, the gradient information of the road, and a physiological or psychological state of the driver, or positional information of the vehicle, gradient illusion occurrence area information, and a state of the driver.

18. A drive assist method, comprising:
acquiring gradient information of a road in which gradient illusion is estimated to occur in a driver of a vehicle;
performing control on an irradiation apparatus provided to the vehicle so that the irradiation apparatus projects;
by an illumination apparatus, a gradient recognition pattern including at least one graphic, based on the gradient information of the road, disposed along an extension direction of a target object, which is located in front and outside of the vehicle and extending along the road, on the target object, and
by a lighting source, the at least one graphic of the gradient recognition pattern on a projection surface provided in front of a seat for the driver of the vehicle and inside of the vehicle to display the gradient recognition pattern in overlapped fashion with the target object, and
controlling the irradiation apparatus based on a predetermined condition so that the irradiation apparatus projects the gradient recognition pattern on the target object, and displays the at least one graphic of the gradient recognition pattern in overlapped fashion with the target object.

* * * * *